(12) United States Patent
Adami

(10) Patent No.: US 10,287,113 B2
(45) Date of Patent: May 14, 2019

(54) SHEET STACKER AND METHOD FOR FORMING STACKS OF SHEETS

(71) Applicant: Guangdong Fosber Intelligent Equipment Co., Ltd., Foshan (CN)

(72) Inventor: Mauro Adami, Viareggio (IT)

(73) Assignee: Guangdong Fosber Intelligent Equipment Co. Ltd., Guangdong Province (CN)

( * ) Notice: Subject to any disclaimer, the term of this patent is extended or adjusted under 35 U.S.C. 154(b) by 0 days.

(21) Appl. No.: 15/274,606

(22) Filed: Sep. 23, 2016

(65) Prior Publication Data

US 2017/0088369 A1 Mar. 30, 2017

(30) Foreign Application Priority Data

Sep. 25, 2015 (EP) .................................... 15186996

(51) Int. Cl.
*B65H 31/28* (2006.01)
*B65H 33/12* (2006.01)
(Continued)

(52) U.S. Cl.
CPC ........... *B65G 57/035* (2013.01); *B65H 31/10* (2013.01); *B65H 31/3054* (2013.01); *B65H 33/08* (2013.01); *B65G 2814/0307* (2013.01); *B65H 2301/42194* (2013.01); *B65H 2404/72* (2013.01); *B65H 2404/721* (2013.01);
(Continued)

(58) Field of Classification Search
CPC ........... B65H 2301/42194; B65H 2301/42192; B65H 33/12; B65H 31/30; B65H 31/26; Y10S 414/114

USPC ....... 271/200, 207, 213, 217, 220, 223, 306, 271/69; 414/789.3, 789.9, 790, 790.6, 414/790.7, 790.8, 791.2, 791.5, 791.6, 414/792, 792.5, 799

See application file for complete search history.

(56) References Cited

U.S. PATENT DOCUMENTS

| | | | | |
|---|---|---|---|---|
| 2,919,789 | A | * | 1/1960 | Coakley ................. B65H 29/66 271/183 |
| 3,241,689 | A | * | 3/1966 | Verrinder ............. B65G 57/035 414/790 |

(Continued)

FOREIGN PATENT DOCUMENTS

| CN | 202245502 U | 5/2012 |
|---|---|---|
| CN | 202414847 U | 9/2012 |

(Continued)

*Primary Examiner* — Gregory W Adams
(74) *Attorney, Agent, or Firm* — Breiner & Breiner, L.L.C.

(57) ABSTRACT

A sheet stacker including a sheet conveyor arrangement and a stacking bay, wherein sheets delivered by the sheet conveyor arrangement are formed into stacks; the stacking bay including a stacker platform. The stacker platform is provided with a vertical lifting and lowering movement with respect to a stationary supporting structure and is controlled to move downwards while a stack of sheets is formed thereon. The stacker platform supports a stack conveyor configured and controlled to perform at least an evacuation motion, to remove a completed stack from the stacking bay. The evacuation motion of the stack conveyor is oriented such that a completed stack is moved from the stacking bay onto an evacuation conveyor arranged under the sheet conveyor arrangement.

17 Claims, 21 Drawing Sheets

(51) Int. Cl.
*B65G 57/03* (2006.01)
*B65H 31/10* (2006.01)
*B65H 31/30* (2006.01)
*B65H 33/08* (2006.01)

(52) U.S. Cl.
CPC ............... *B65H 2701/176* (2013.01); *B65H 2701/1762* (2013.01); *B65H 2701/1764* (2013.01)

(56) References Cited

U.S. PATENT DOCUMENTS

| | | | | |
|---|---|---|---|---|
| 3,366,253 | A * | 1/1968 | Walchhuter | B65G 57/11 414/790 |
| 4,133,523 | A * | 1/1979 | Berthelot | B65H 29/6618 271/182 |
| 4,222,697 | A * | 9/1980 | Vits | B65H 31/32 271/218 |
| 4,273,325 | A | 6/1981 | Rodewald | |
| 4,500,243 | A * | 2/1985 | Ward, Jr. | B65H 31/18 271/197 |
| 4,610,593 | A * | 9/1986 | Voss | B65H 29/14 414/790.7 |
| 4,786,229 | A * | 11/1988 | Henderson | B65G 1/1371 209/630 |
| 4,890,825 | A * | 1/1990 | McCormick | B65H 31/38 271/188 |
| 4,949,953 | A * | 8/1990 | Claassen | B65H 31/32 271/218 |
| 4,984,963 | A * | 1/1991 | Bon | B65G 57/005 414/789.5 |
| 5,653,574 | A * | 8/1997 | Lin | B65G 57/00 414/791.5 |
| 5,664,767 | A * | 9/1997 | Voss | B65H 31/32 271/189 |
| 5,672,045 | A * | 9/1997 | Schmid | B65G 47/53 414/790.8 |
| 5,685,536 | A * | 11/1997 | Barthold | B65H 31/26 211/51 |
| 5,829,951 | A | 11/1998 | Adami | |
| 6,113,344 | A * | 9/2000 | Crowley | B65H 3/327 414/791.2 |
| 6,227,537 | B1 * | 5/2001 | Schmid | B65H 9/02 182/143 |
| 6,338,607 | B1 * | 1/2002 | Vincent | B65G 47/088 414/789.9 |
| 6,776,572 | B2 * | 8/2004 | Reist | B65H 29/66 414/789.9 |
| 6,991,229 | B2 * | 1/2006 | Yamakawa | B65H 29/041 271/204 |
| 7,641,195 | B2 * | 1/2010 | Suzuki | B65H 29/28 271/204 |
| 7,857,307 | B2 * | 12/2010 | Tamura | B65H 29/041 271/223 |
| 8,326,208 | B2 * | 12/2012 | Tamura | B65H 29/14 271/213 |
| 8,387,974 | B2 * | 3/2013 | Hayashi | B65H 31/34 271/213 |
| 2009/0169351 | A1 | 7/2009 | Wu | |
| 2013/0161895 | A1 * | 6/2013 | Lin | B65H 29/14 271/69 |
| 2013/0207333 | A1 * | 8/2013 | Brundige | G03G 15/6544 270/58.08 |
| 2014/0353119 | A1 | 12/2014 | Wu | |

FOREIGN PATENT DOCUMENTS

| | | |
|---|---|---|
| CN | 202492218 U | 10/2012 |
| CN | 203255778 U | 10/2013 |
| CN | 204057396 U | 12/2014 |
| EP | 0399623 A2 | 11/1990 |
| EP | 0792831 A1 | 9/1997 |
| TW | M423688 U | 3/2012 |

\* cited by examiner

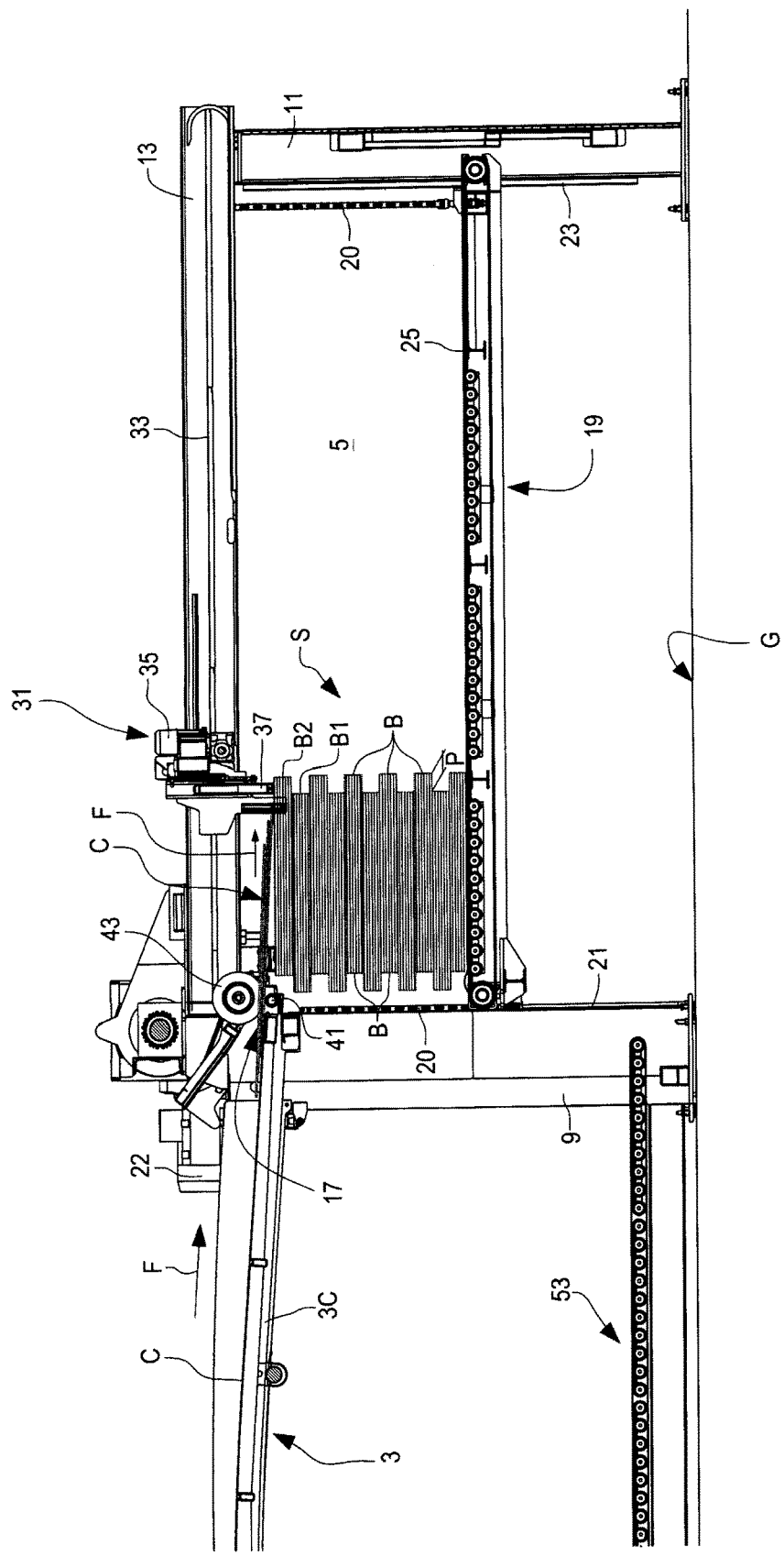

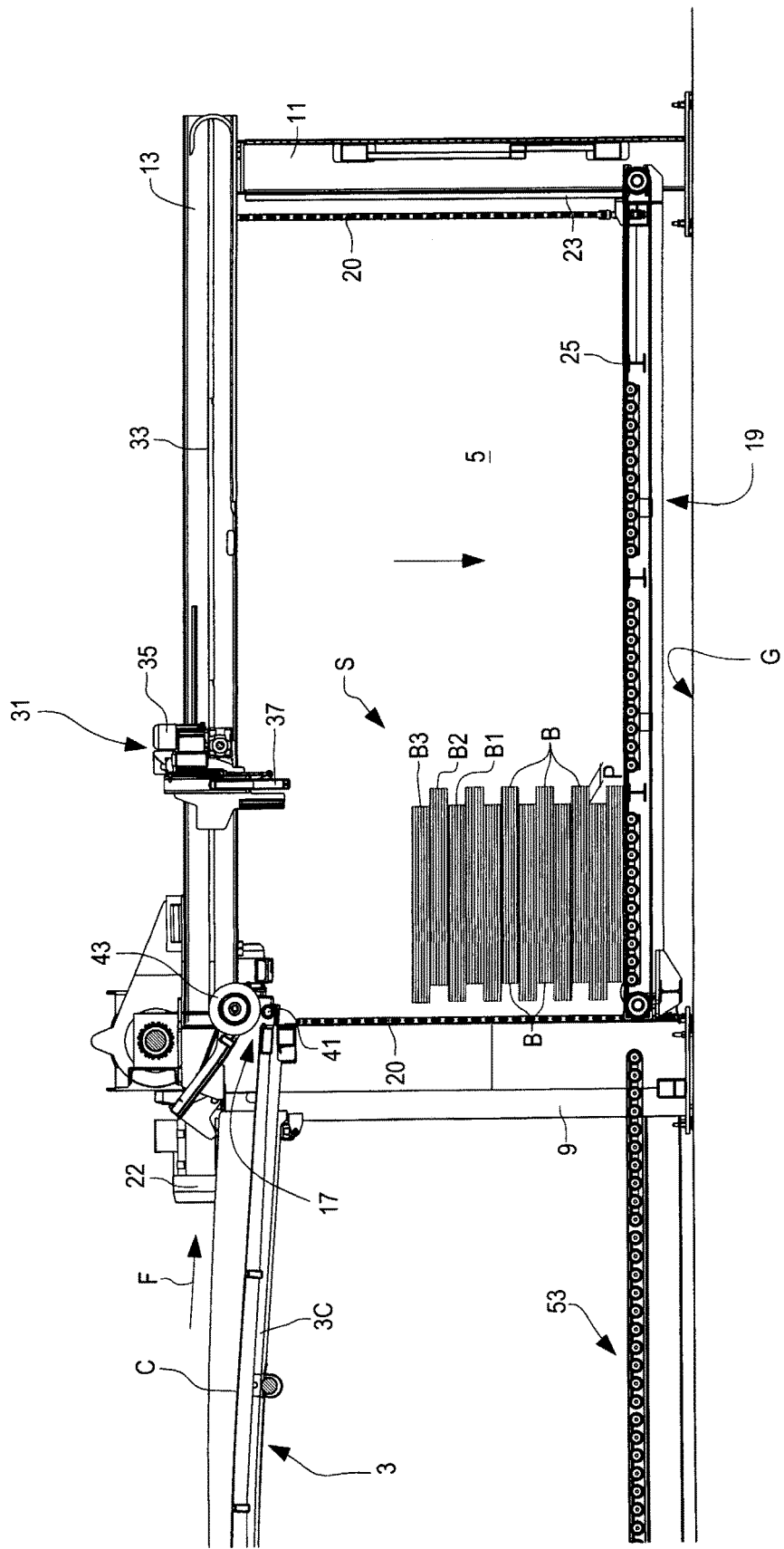

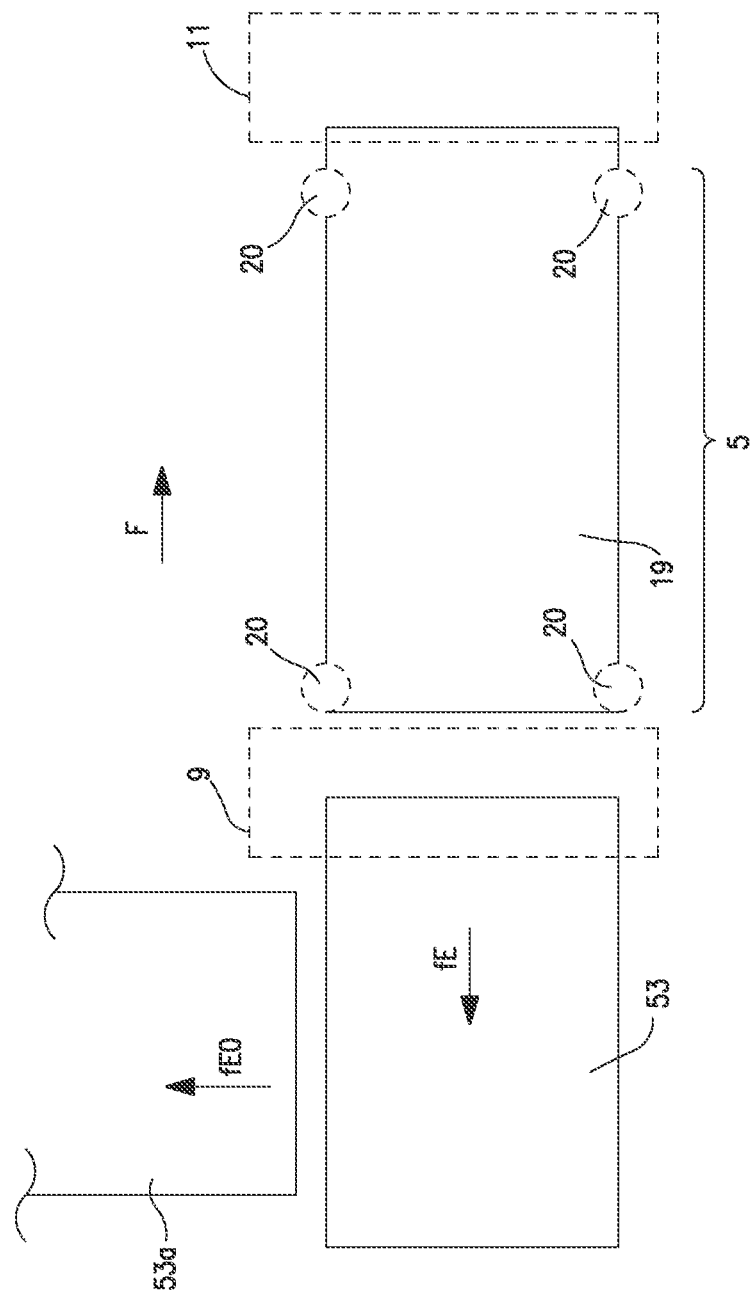

SHEET STACKER AND METHOD FOR FORMING STACKS OF SHEETS

FIELD OF THE INVENTION

The invention relates to sheet stacking devices and methods, useful for the formation of stacks of cardboard sheets, such as, but not limited to, corrugated cardboard sheets. In particular, the invention concerns so-called down-stackers, i.e. sheet stackers wherein the stacks are formed on a downwardly moving stacker platform.

BACKGROUND ART

In the paper industry, cardboard sheets are manufactured starting from a continuous web like cardboard material, which is slit longitudinally and divided into strips. Each strip is further divided transversely to generate a plurality of sheets of desired length. Sheets thus obtained are delivered to a so-called stacker or stacking apparatus, which forms stacks or bundles of sheets. The stacks are subsequently delivered to the final user, for example for the manufacturing of cardboard boxes or the like. Small bundles can be combined into larger stacks before shipping.

Fast advancing sheets must be carefully piled up to form stacks of regular shape. Known stacking apparatuses usually comprise a sheet conveyor arrangement which receives a substantially continuous flow of sheets which are shingled and delivered onto a stacking surface in a stacking bay.

In some cases, each stack is formed by staggered bundles, each bundle containing a predetermined number of sheets. TW-M423688U, US2014/0353119 and US2009/0169351 disclose sheet stackers configured and controlled for forming stacks of mutually staggered bundles of cardboard sheets. In order to mutually stagger neighboring bundles of the stack, said stack is formed on a horizontally movable stacker platform. The reciprocating staggering motion is in a direction substantially parallel to the feed direction of the cardboard sheets. The stacker platform comprises a conveyor belt, forming a stacking surface. The conveyor belt has a horizontal conveying motion, orthogonal to the reciprocating staggering motion of the stacker platform. The conveyor belt is used to evacuate the formed stack from the stacking bay according to an evacuation direction which is substantially orthogonal to the direction of arrival of the cardboard sheets in the stacking bay. Each bundle of a stack is formed against a single stop plate or a dual stop plate, which are arranged in two positions which are staggered along the direction of arrival of the cardboard sheets. Staggering of neighboring bundles is obtained by means of a reciprocating motion of the stacker platform in a horizontal direction. Moving the entire stacker platform is difficult and requires strong actuators and a particularly sturdy structure.

CN204057396U and CN203255778U disclose further embodiments of stackers designed and configured for producing stacks of sheets, each formed by a plurality of staggered bundles. Staggering is obtained by using two mutually spaced apart stop plates. The distance between the stop plates is equal to the staggering of neighboring bundles. In addition to moving the stop plates, the sheet discharge end of the sheet conveyor must also be reciprocatingly moved back and forth in a direction parallel to the feed direction, to achieve correct staggering of adjacent bundles.

In other known sheet stackers, smooth stacks are formed, as disclosed e.g. in U.S. Pat. No. 4,273,325.

U.S. Pat. No. 5,829,951 discloses an up-stacker, i.e. a sheet stacker wherein the stacks are formed on a stationary stacker platform, and wherein a sheet conveyor arrangement is provided having a downstream sheet discharge end, wherefrom the sheets are discharged onto the stack being formed, moves gradually upwards as the stack grows vertically. This known stacker is suitable for the formation of small stacks or bundles of sheets.

One of the critical aspects of sheet stackers is the transient phase of removing the formed stack from the stacking bay. Removing the stack requires a gap to be formed in the otherwise continuous flow of sheets delivered by the sheet conveyor arrangement to the stacking bay. The longer the time required for removing a just formed stack of sheets from the stacking bay, the larger the gap required in the sheet flow. This transient phase slows down the operation of the sheet stacker and thus adversely affects the mean production rate thereof. Also, forming a large gap in the sheet flow can be difficult.

A need therefore exists, for reducing the time of such transient phases.

SUMMARY OF THE INVENTION

According to the invention a sheet stacker is provided, comprising:
a sheet conveyor arrangement, configured for feeding a plurality of sheets in succession in a sheet feeding direction, said sheet conveyor arrangement having a sheet discharge end; and
a stacking bay, wherein sheets delivered by the sheet conveyor arrangement at the sheet discharge end thereof are formed into stacks; the stacking bay comprising a stacker platform, and wherein the stacker platform is provided with a vertical lifting and lowering movement with respect to a stationary supporting structure and is controlled to move downwards while a stack of sheets is formed thereon.

The stacker platform supports a stack conveyor movable in a direction parallel to a feed direction of the sheets in the stacking bay, configured and controlled to perform at least an evacuation motion, to remove a completed stack from the stacking bay; and the evacuation motion of said stack conveyor is oriented such that a completed stack is moved from the stacking bay onto an evacuation conveyor arranged under the sheet conveyor arrangement.

The stack conveyor can be further controlled to perform reciprocating staggering motion to form staggered bundles of sheets, and to further perform.

The sheet stacker can further comprise a stop plate, positioned in the stacking bay above the stacker platform, arranged and configured for stopping the sheets delivered by the sheet conveyor arrangement to the stacking bay.

The stop plate can be provided with a reciprocating vertical movement, which is synchronized with the formation of staggered bundles of sheets.

The sheet discharge end of the sheet conveyor arrangement can be combined with an actuator, which controls a lifting and lowering movement of the sheet discharge end, which is synchronized with the reciprocating staggering motion of the stack conveyor.

The stack conveyor can comprise a first stack conveyor member and a second stack conveyor member, which are sequentially arranged one after the other in a direction parallel to the direction of the evacuation motion The sheet discharge end can be combined with a bundle retaining device, which is configured and arranged for retaining the top-most bundle of the stack when the stack conveyor performs the staggering motion in a direction away from the sheet discharge end.

The bundle retaining device can comprise at least one resilient sheet braking member, arranged under the sheet discharge end, between the sheet discharge end and the stack being formed on the stacker platform.

According to a further aspect of the invention, a method of forming sheet stacks on a stacking surface, is provided. The method comprises the following steps:

feeding a plurality of sheets along a sheet conveyor arrangement towards a stacking bay, the sheet conveyor arrangement having a sheet discharge end, wherefrom the sheets are discharged in the stacking bay and formed into stacks on a stack conveyor supported by a stacker platform arranged in the stacking bay;

while the sheet stack gradually grows on the stacking surface, moving the stacker platform gradually downwards to increase the distance between the stacker platform and the sheet discharge end of the sheet conveyor arrangement;

once a stack has been completed, moving the stack by means of the stack conveyor from the stacker platform onto an evacuation conveyor located under the sheet conveyor arrangement.

During formation of the stack, the stack can be divided in mutually superposed and staggered bundles of sheets by reciprocatingly moving the stack conveyor according to a back-and-forth staggering motion, in a direction parallel to a feed direction of the sheets in the stacking bay.

The method can further comprise the step of lifting the sheet discharge end from the top of the stack under formation on the stacker platform when the stack under formation is moved by the stack conveyor towards the sheet discharge end during the back-and-forth staggering motion of the stack conveyor.

The method can also comprise a step of abutting the sheets coming from the sheet conveyor arrangement against a stationary stop plate arranged above the stacker platform.

The method can further comprise a step of reciprocatingly moving the stop plate in a vertical direction in synchronism with the back-and-forth staggering motion of the stack conveyor.

Other features and advantages of the invention will be better appreciated from the following detailed description of exemplary embodiments.

BRIEF DESCRIPTION OF THE DRAWINGS

A more complete appreciation of the disclosed embodiments of the invention and many of the attendant advantages thereof will be readily obtained as the same becomes better understood by reference to the following detailed description when considered in connection with the accompanying drawings, wherein:

FIGS. 4(A)-4(I) illustrate a sequence of steps of a stack-forming cycle;

FIG. 11 is a partial schematic top view along line 11-11 of FIG. 1 FIG. 11 illustrates evacuation conveyors 53, 53a in relation to stacker platform 19, wherein evacuation conveyor 53 is arranged for moving stacks of sheets in evacuation direction fE (which is opposite to feed direction F) from stacker platform 19 and evacuation conveyor 53a is arranged for moving stacks of sheets from conveyor 53 in an evacuation direction orthogonal (arrow fEO) to evacuation direction fE.

DETAILED DESCRIPTION OF EMBODIMENTS OF THE INVENTION

The following detailed description of the exemplary embodiments refers to the accompanying drawings. The same reference numbers in different drawings identify the same or similar elements. Additionally, the drawings are not necessarily drawn to scale. Also, the following detailed description does not limit the invention. Instead, the scope of the invention is defined by the appended claims.

Reference throughout the specification to "one embodiment" or "an embodiment" or "some embodiments" means that the particular feature, structure or characteristic described in connection with an embodiment is included in at least one embodiment of the subject matter disclosed. Thus, the appearance of the phrase "in one embodiment" or "in an embodiment" or "in some embodiments" in various places throughout the specification is not necessarily referring to the same embodiment(s). Further, the particular features, structures or characteristics may be combined in any suitable manner in one or more embodiments.

Figure 1:
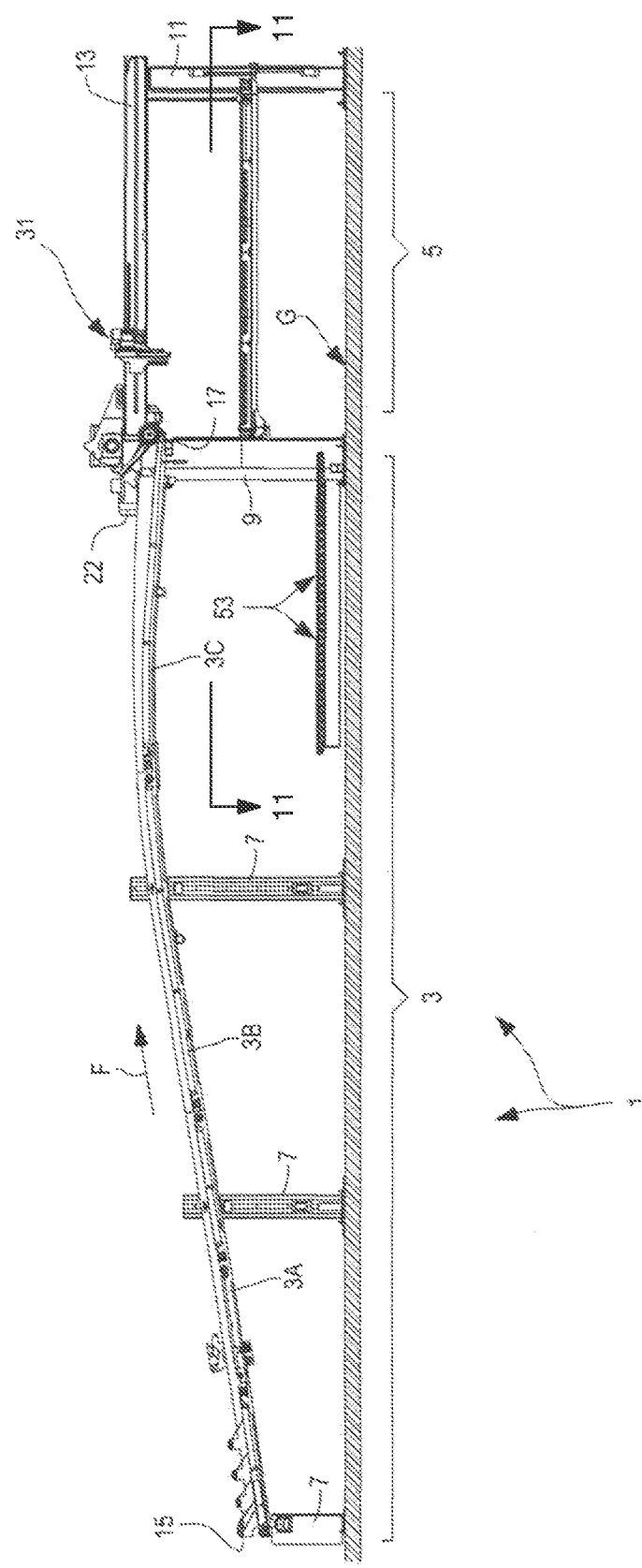
FIG. 1 illustrates a side view of a sheet stacker according to the invention.

Referring now to FIG. 1, a sheet stacker 1 for the formation of stacks of sheets is globally labeled 1. The sheet stacker 1 comprises a sheet conveyor arrangement 3 and a stacking bay 5. According to some embodiments, as shown in FIG. 1, the sheet conveyor arrangement 3 comprises a plurality of sequentially arranged sheet conveyors 3A, 3B, 3C, which define a sheet delivery path. Each sheet conveyor 3A-3C can be comprised of one or more endless flexible members, such as belts or the like, which are entrained around idle and motor-driven rollers to advance the sheets towards the stacking bay 5. The sheet conveyor arrangement 3 can be supported by a stationary supporting structure comprised of uprights 7, 9. The stationary supporting structure can further include uprights 11 and a cross member 13 surrounding the stacking bay 5.

The sheet conveyor arrangement 3 has a sheet inlet side 15 and a sheet discharge end 17. Sheets, e.g. corrugated cardboard sheets coming from a slitter-scorer or other upstream section (not shown) of the manufacturing line, enter the sheet conveyor arrangement 3 at the sheet inlet side 15 and are advanced according to a feeding direction F towards the sheet discharge end 17, where the sheets are discharged in the stacking bay 5 to form stacks of sheets as will be described later on.

Figure 2:
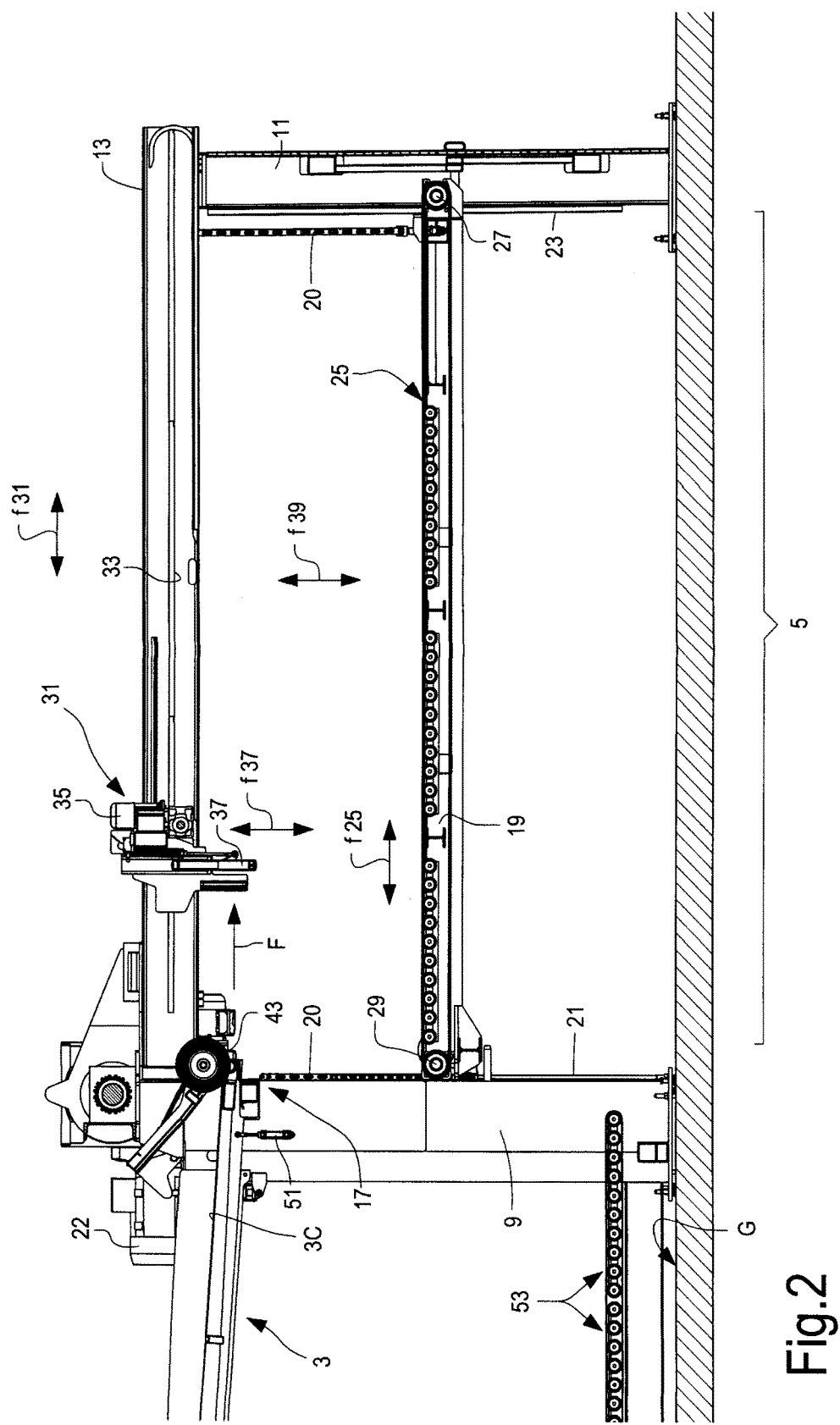
FIG. 2 illustrates an enlargement of the sheet stacker of FIG. 1, showing the end of the sheet conveyor arrangement and the stacking bay.

Referring now to FIG. 2, with continuing reference to FIG. 1, the stacking bay 5 comprises a stacker platform 19 which can move vertically up and down according to arrow f19, e.g. by means of an electric motor (not shown). The stacker platform 19 can be supported by chains 20, or other lifting members, which are acted upon by an electric motor 22 to move the stacker platform 19 in a vertical up-and-down direction according to double arrow f19. The stacker platform 19 can be vertically guided by guides 21, 23 formed on uprights 9, 11. As shown in FIGS. 1 and 2 the stacker platform 19 supports a stack conveyor 25. The latter can be comprised of one or more endless flexible members entrained around rollers 27, 29, one of which at least is motor-driven, while the other can be idle.

The stack conveyor 25 is controlled to move back-and-forth in a substantially horizontal direction f25, parallel to the stacker platform 19 and approximately parallel to a feed direction F according to which the sheets enter the stacking bay 5. It shall be understood that the actual feed direction F of the sheets upon leaving the sheet conveyor arrangement 3 can be inclined to some extent with respect to the horizontal direction, such that the sheet feeding direction F can have an upwardly or downwardly oriented speed component when the sheets first enter the stacking bay 5. However, the sheets enter the stacking hay 5 according to a direction F which lays in a vertical plane parallel to FIGS. 1 and 2 and thus parallel to the direction of motion of the stack conveyor 25. The sheets will be stacked, i.e. piled up on the stacker platform 19 in a horizontal direction. Thus the feeding direction of the sheets in the final portion of the feeding path is generally horizontal and generally parallel to the direction of motion f25 of the stack conveyor 25.

Along the cross member 13 a carriage 31 can be slidingly mounted. The carriage 31 can move along guides 33 according to double arrow f31 under the control of a motor 35, e.g. through a rack-and-pinion transmission system or the like. The carriage 31 supports a stop plate 37 which can extend in a general vertical direction. The stop plate 37 can move vertically up and down according to double arrow f37 under the control of a suitable actuator, such as a cylinder-piston actuator 38, an electric or hydraulic motor, or the like.

Figure 3:
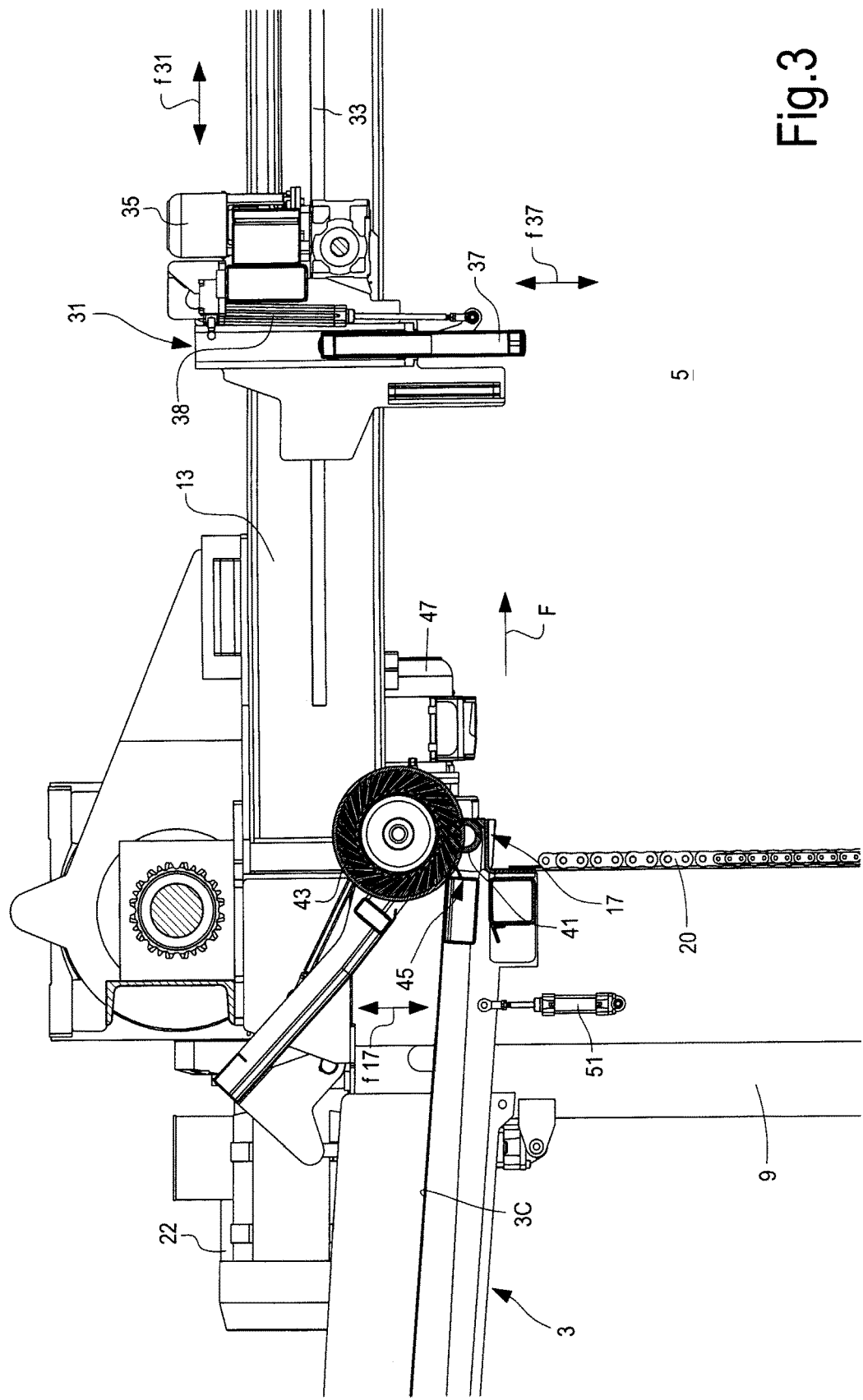
FIG. 3 illustrates an enlargement of the sheet discharge end of the sheet conveyor arrangement.

Referring now to FIG. 3, with continuing reference to FIGS. 1 and 2, according to some embodiments, the sheet discharge end 17 of the sheet conveyor arrangement 3 can comprise, in a manner known to those skilled in the art, a bottom roller 41 and a top roller 45, which define in combination a sheet discharge nip, where through the sheets conveyed by the sheet conveyor arrangement 3 are discharged in the stacking bay 5. The bottom roller 41 can be a motorized roller which controls the movement of the most downstream conveyor 3C of the sheet conveyor arrangement 3. Reference number 47 designates by way of example an electric motor which controls the motion of the most downstream conveyor 3C through rotation of the bottom roller 41.

The sheet discharge end 17 of the sheet conveyor arrangement 3 can be movable in a vertical direction according to double arrow f17, e.g. under the control of a linear actuator, such as a cylinder-piston actuator schematically shown at 51, for the purpose which will become clear from the description of the sequence of operations shown in FIGS. 4(A)-4(I).

Turning now back to FIG. 1, under the last portion of the sheet conveyor arrangement, an evacuation conveyor 53 can be arranged, which can be positioned near the ground level G.

Figure 4A:
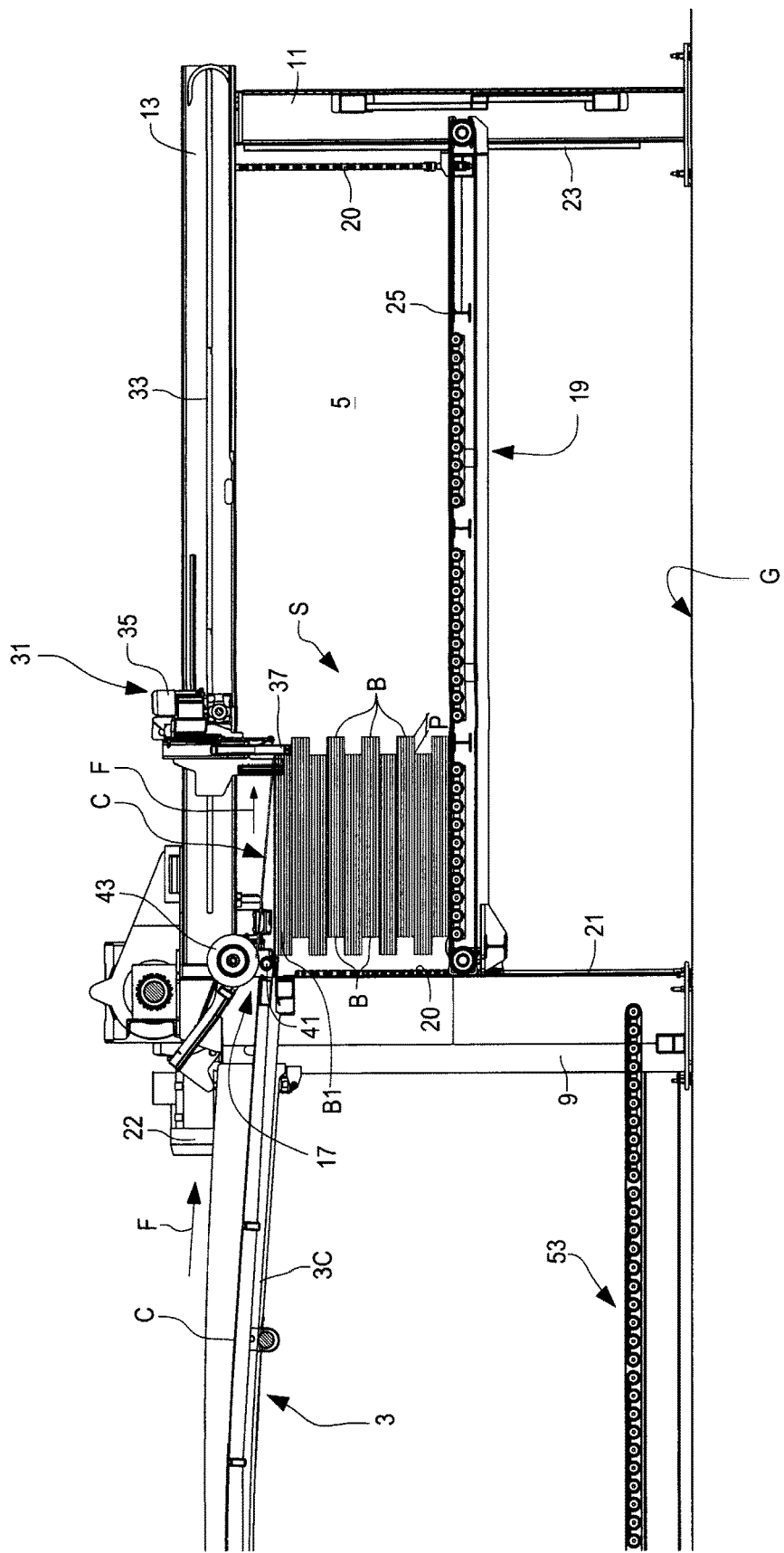

The operation of the sheet stacker described so far will now be described with reference to the sequence of FIGS. 4(A)-4(I). According to the operation cycle described here below, the sheet stacker 1 is configured and controlled to produce stacks S of cardboard sheets C, wherein each stack S is in turn divided into bundles B, each bundle comprising a certain number of cardboard sheets C. The number of sheets of each bundle B of a stack S can be constant. As best shown in FIG. 4(A) for instance, the cardboard sheets C advance in a shingled arrangement along the sheet conveyor arrangement 3 and are individually fed through the nip 45 into the stacking bay 5. A stack S is being formed on the horizontal surface defined by the stack conveyor 25 supported on the stacker platform 19. The bundles B of sheets which form the stack S are staggered by a pitch P. The number of sheets per bundle B, the number of bundles B per stack S and the staggering pitch P can be set by the user, e.g. through an interface of a control unit, not shown.

The bundles B are staggered in the direction F of feed of the cardboard sheets C in the stacking bay 5, i.e. in the direction of motion f25 of the stack conveyor 25. Thus, staggering of mutually superposed bundles B is obtained by means of a back-and-forth, i.e. a reciprocating staggering motion of the stack conveyor 25 according to double arrow f25.

During stacking, the stop plate 37 is located at a distance from the sheet discharge end 17 of the sheet conveyor arrangement 3, which is determined by the dimension of the cardboard sheets C in the direction F. In this way, each cardboard sheet C delivered into the stacking hay 5 will advance until reaching the stop plate 37, and all the sheets C will thus be aligned with their most advanced edges abutting against the stop plate 37.

Figure 4B:
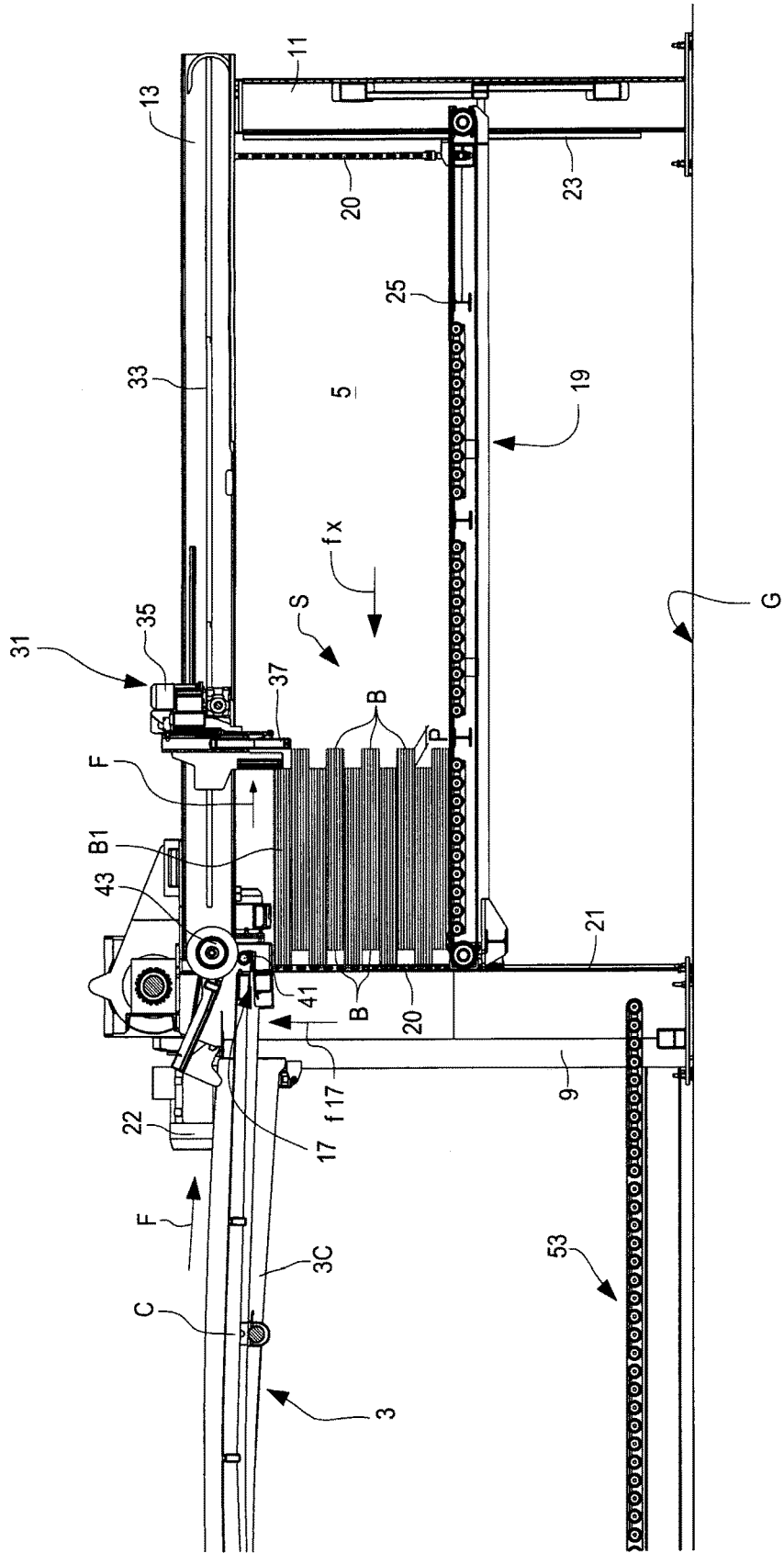

In order to stagger the bundles B in the direction f25, once the desired number of cardboard sheets C forming a bundle B has been piled up, the stack conveyor 25 moves by a pitch P alternatively towards the sheet conveyor arrangement 3 and away therefrom. Starting from FIG. 4(A), once the top-most bundle, labeled B1 in FIG. 4(A), has been completed, the stack S under formation is moved on the left according to arrow fx, such that the stack S moves slightly underneath the sheet discharge end 17 of the sheet conveyor arrangement 3. FIG. 4(B) shows the stack S in the new position, after the staggering movement according to fx has been performed.

In order to allow the trailing edges of the sheets (i.e. the most upstream edges of the cardboard sheets C with respect to the direction of feed F) of the last formed bundle B to move under the sheet discharge end 17, the stacker platform 19 can be lowered, or the sheet discharge end 17 of the sheet conveyor arrangement 3 can be lifted, or a combination of the two movements can be performed. According to presently preferred embodiments, the sheet discharge end 17 is lifted (arrow f17, FIG. 4(B)) by means of the actuator 51 and then lowered again (arrow f17, FIG. 4(C)). This movement can be quicker than a lowering movement involving the stacker platform 19, as the sheet discharge end is lighter than the stacker platform 19, which also supports the weight of the stack S under formation.

The stop plate 37 can remain stationary in this step of the stacking process, such that when formation of the subsequent bundle B2 starts, the most advance, i.e. the leading edges of the cardboard sheets C will advance until the stop plate 37, thus reaching the same position with respect to the stacking bay 5. Since the stack S has been shifted (arrow fx) towards the left by a pitch P, the next bundle B2 will be staggered by a distance P along direction F with respect to the previously formed bundle B1.

Figure 4C:
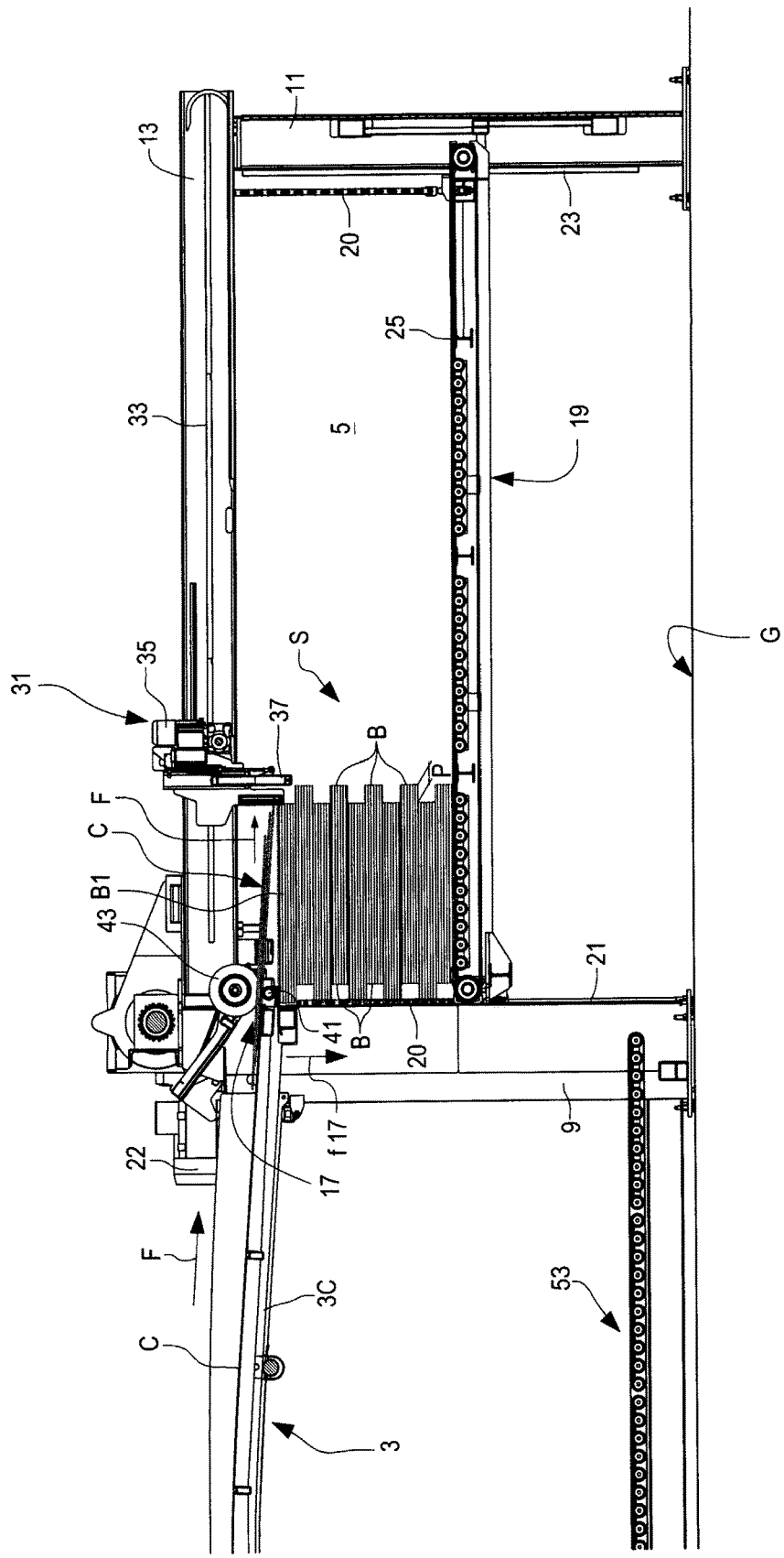
Figure 4D:
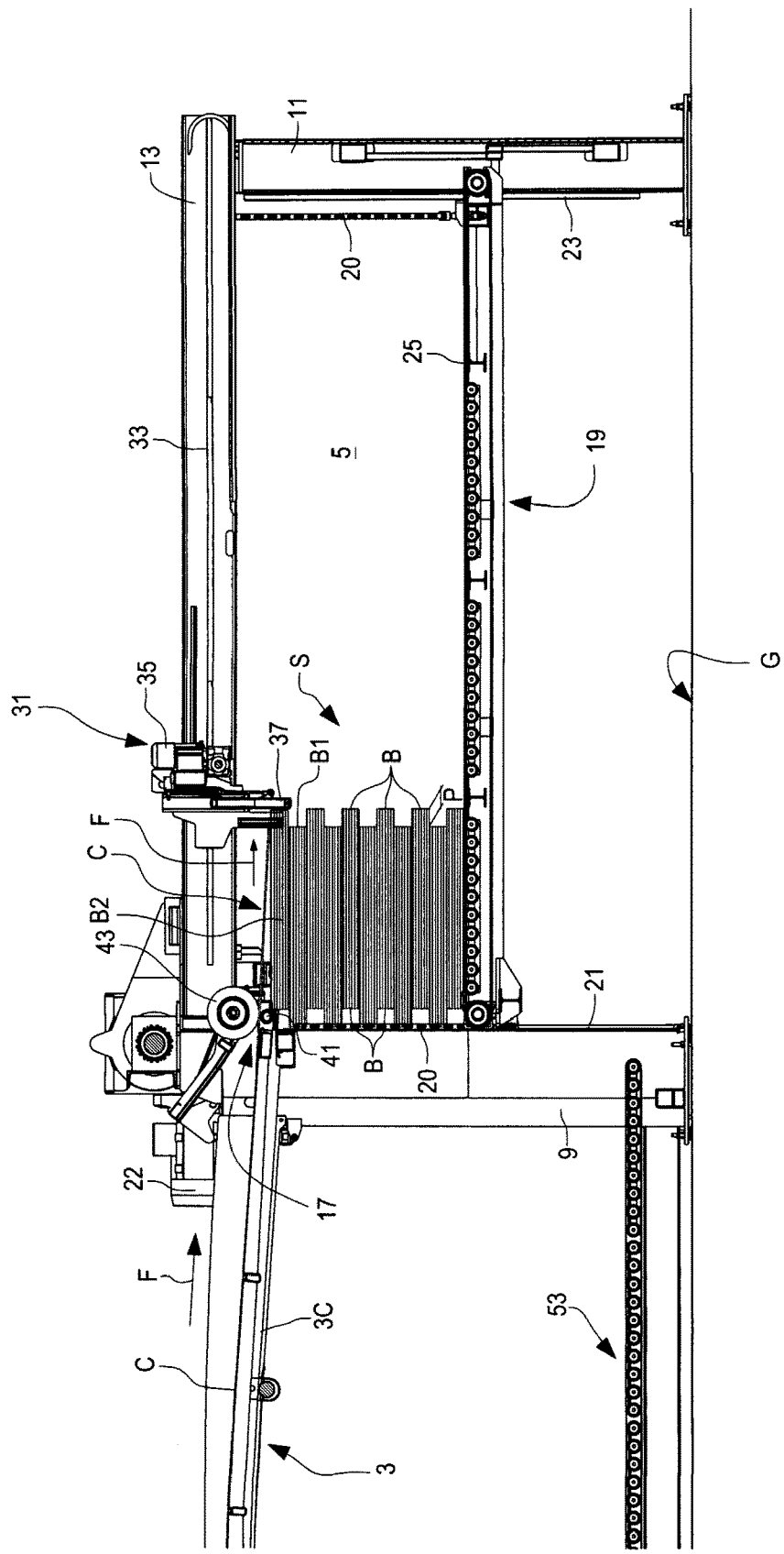
Figure 4E:
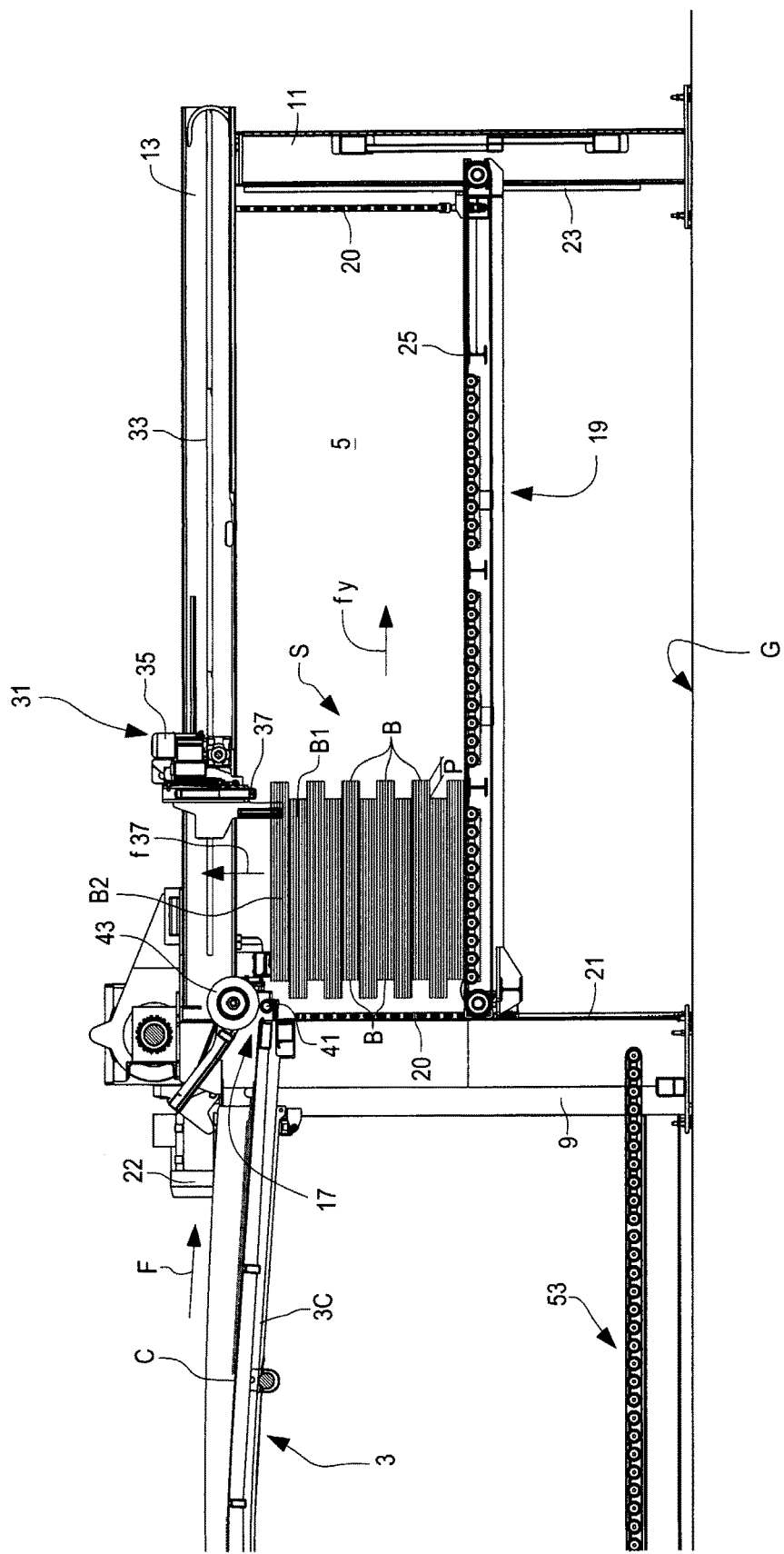

FIG. 4(C) shows the initial phase of formation of the next bundle B2, while FIG. 4(D) shows the subsequent phase, where the next bundle B2 has been completed. At this stage a new bundle B3, which is staggered by a pitch P with respect to bundle B2 and aligned with the bundle B1, must be formed. For this purpose, the stack conveyor 25 is actuated and moves the stack S under formation according to arrow fy (FIG. 4(E)) from the left to the right by a pitch P. The most downstream edge (i.e. the leading edge) of the bundle B2 just formed must move horizontally beyond the stop plate 37. The cylinder-piston actuator 38 thus lifts the stop plate 37 in order to allow the bundle B2 to move there under.

Once the stack S has been moved by one pitch P in the direction fy, formation of the next bundle B3 can start, as shown in FIG. 4(F). The stop plate 37 has been lowered again, such that the cardboard sheets C are correctly positioned by abutting with their leading edges against the stop plate 37. The stop plate 37 is thus controlled by the actuator 38 to perform a vertical reciprocating motion which is synchronized with the formation of staggered bundles of sheets.

Figure 4G:
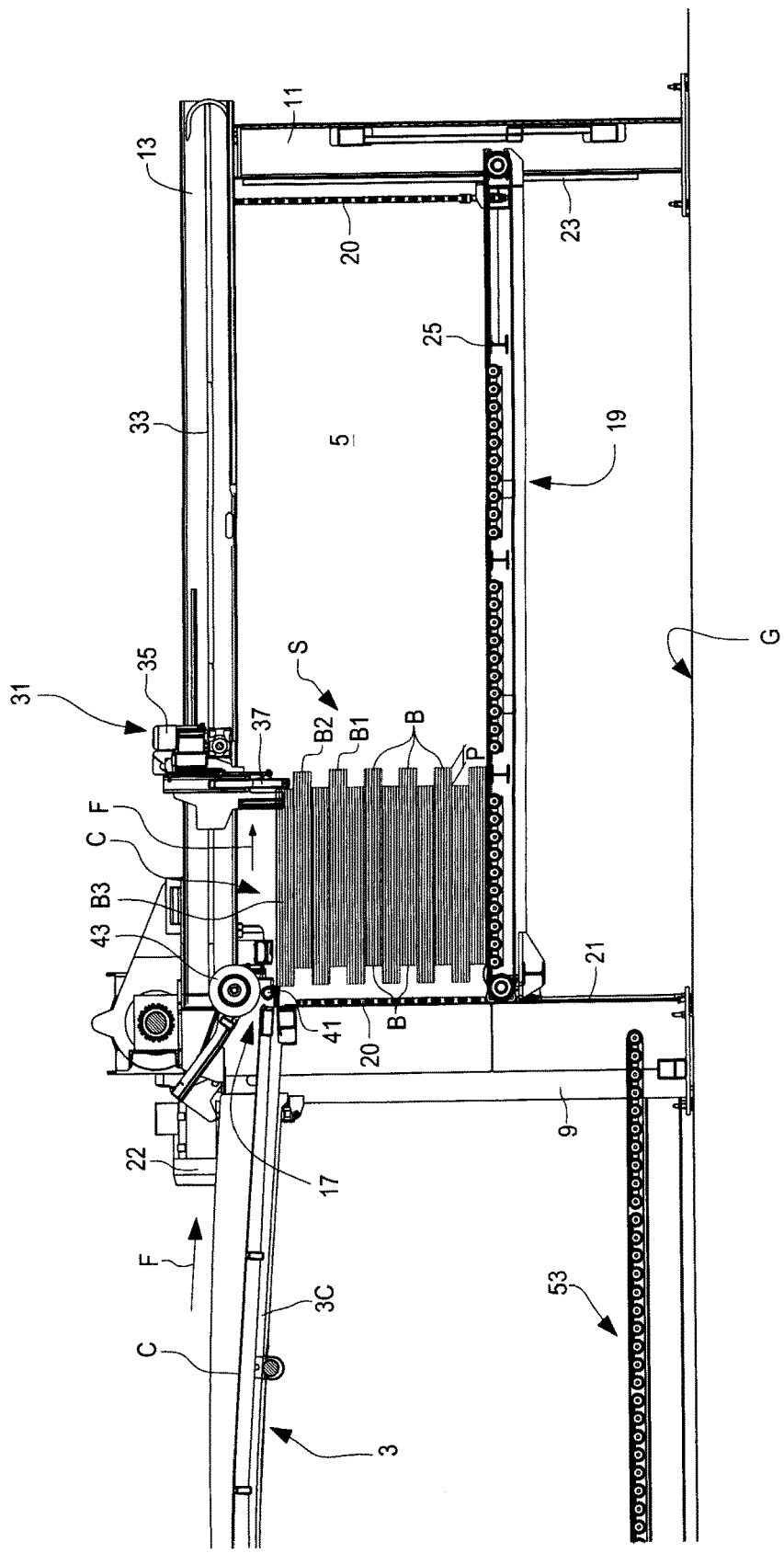

In the next FIG. 4(G) the subsequent bundle B3 is almost completed.

During the above described sequence, the stacker platform 19 gradually lowers to accommodate the stack S on top of the stack conveyor 25, such that the sheet discharge end 17 of the sheet conveyor arrangement 3 can remain substantially at the same height, except for the small up and down stroke according to arrow f17, which is performed by the sheet discharge end 17 each time the stack S is moved according to arrow fx to displace the trailing edge of the top-most bundle under the sheet discharge end 17. The sheet stacker is thus configured as a so-called down-stacker, i.e. the stack is formed by lowering the stack such that the upper surface thereof remains substantially around a constant position.

In order for the stack conveyor 25 to perform the bundle staggering movement, a gap in the flow of cardboard sheets 3 on the sheet conveyor arrangement 3 must be generated, which separates the last cardboard sheet C of one bundle from the first cardboard sheet C of the next bundle. The gap can be created in anyone of the know methods used to create gaps in the flow of cardboard sheets C. The dimension of the gap can be controlled on the basis of several operation parameters of the stacker 1, for instance the speed of advance of the cardboard sheets C, their length and so on.

The gap can be formed e.g. acting upon the speed of the various conveyors 3A, 3B, 3C forming the sheet conveyor arrangement 3.

The number of cardboard sheets C per bundle B can be counted in a rotary shear used to cut a continuous longitudinal cardboard web, each cut corresponding to one sheet. The last sheet of a bundle is then tracked by means of suitable encoders, for instance, along the path up to the stacking bay 5.

Figure 4I:
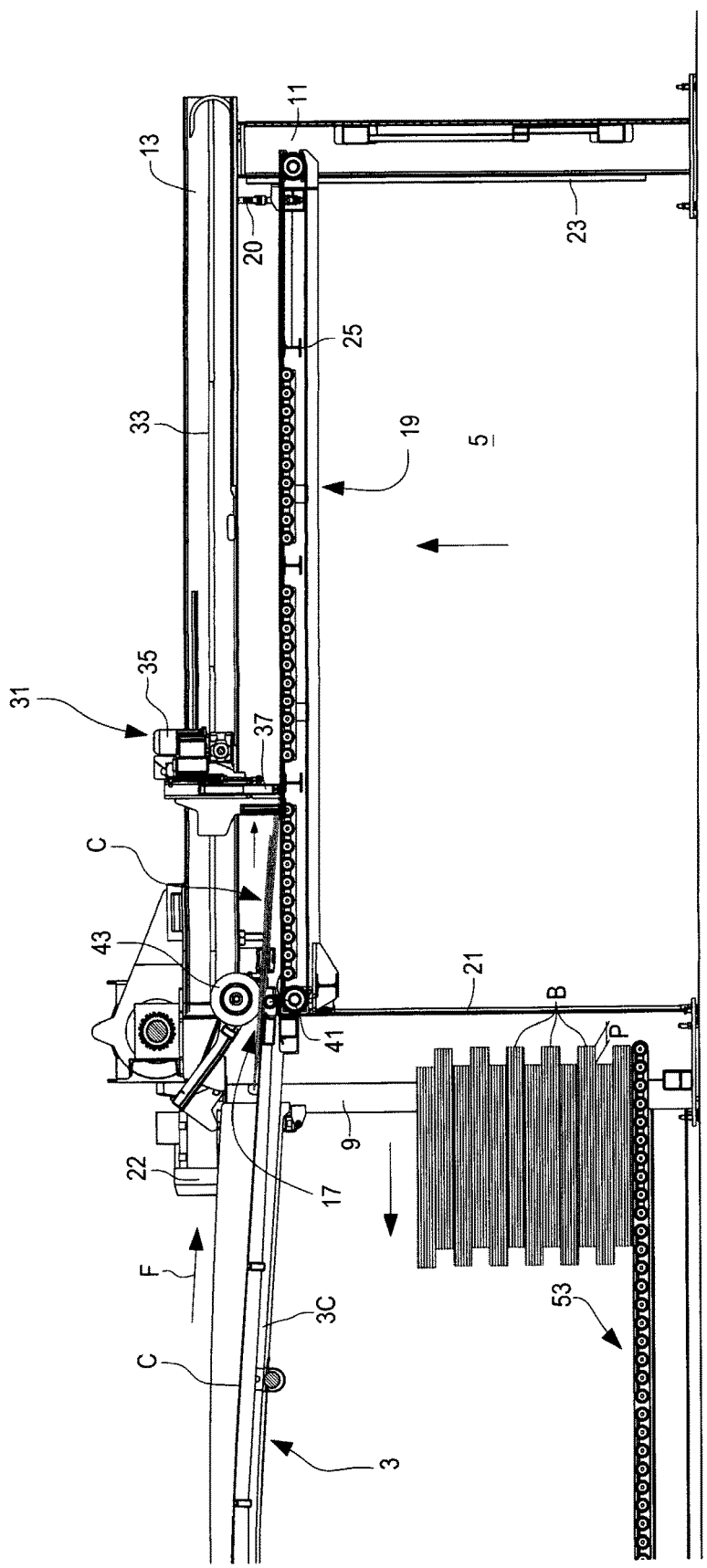

Once the required number of bundles B forming a stack S has been formed as described above, the stack S must be evacuated from the stacking bay 5. The evacuation step is illustrated in FIGS. 4(H) to 4(I). The flow of incoming cardboard sheets C from the sheet conveyor arrangement 3 is interrupted by creating therein a gap in any one of different possible ways, known to those skilled in the art. During the time made available by the gap the formed stack S is moved downwards by lowering the stacker platform 19, as shown in FIG. 4(H), until the upper surface of the stack conveyor 25 is substantially at the same level as the evacuation conveyor 53, while the stack conveyor 25 can remain inoperative, such that the stack S only moves vertically. Once this position has been achieved, the stack conveyor 25 can be activated again, to perform an evacuation motion and displace the stack S towards the evacuation conveyor 53, as shown in FIG. 4(I).

As soon as the stack S has cleared off the stacker platform 19, the latter can be lifted again, in the initial position where the formation of a new stack can start, as shown in FIG. 4(I).

The time required for evacuating the stack S is extremely short, since the distance the stack S must travel substantially corresponds to the dimension of the stack in the direction F.

If the stack S has not been properly cleared off the stacker platform, e.g. if a part thereof remains on the stacker platform 19, when the latter is lifted, the remaining sheets which are still erroneously placed on the stacker platform 19 will cause an unexpected titling movement of the sheet discharge end 17 of the conveyor 3C. This unexpected movement can be detected by a sensor, e.g. a micro-switch, which can trigger an alarm.

Figure 5:
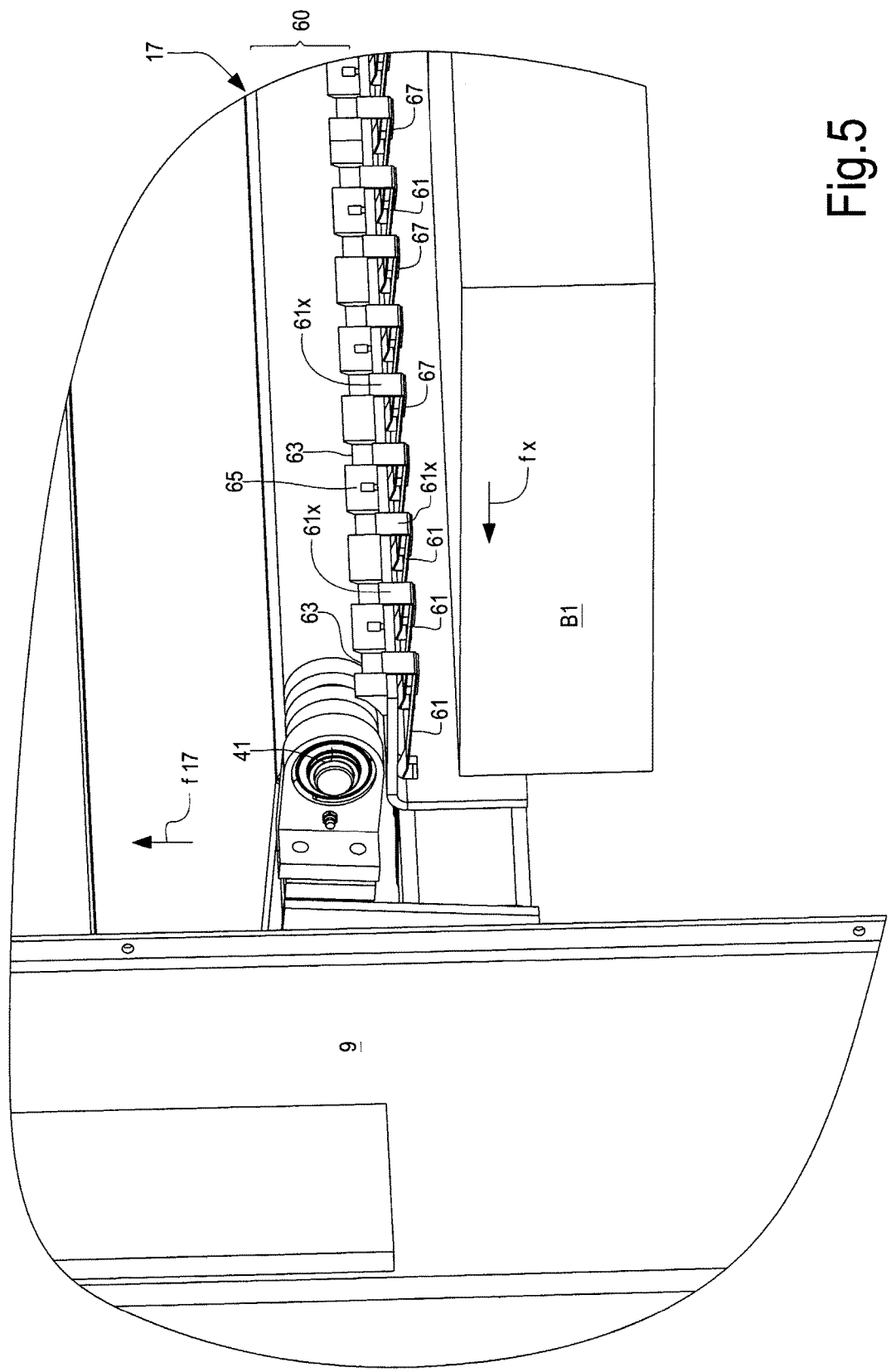
FIGS. 5 and 6 illustrate a detail of a bundle retaining device in two different operating positions.
Figure 6:
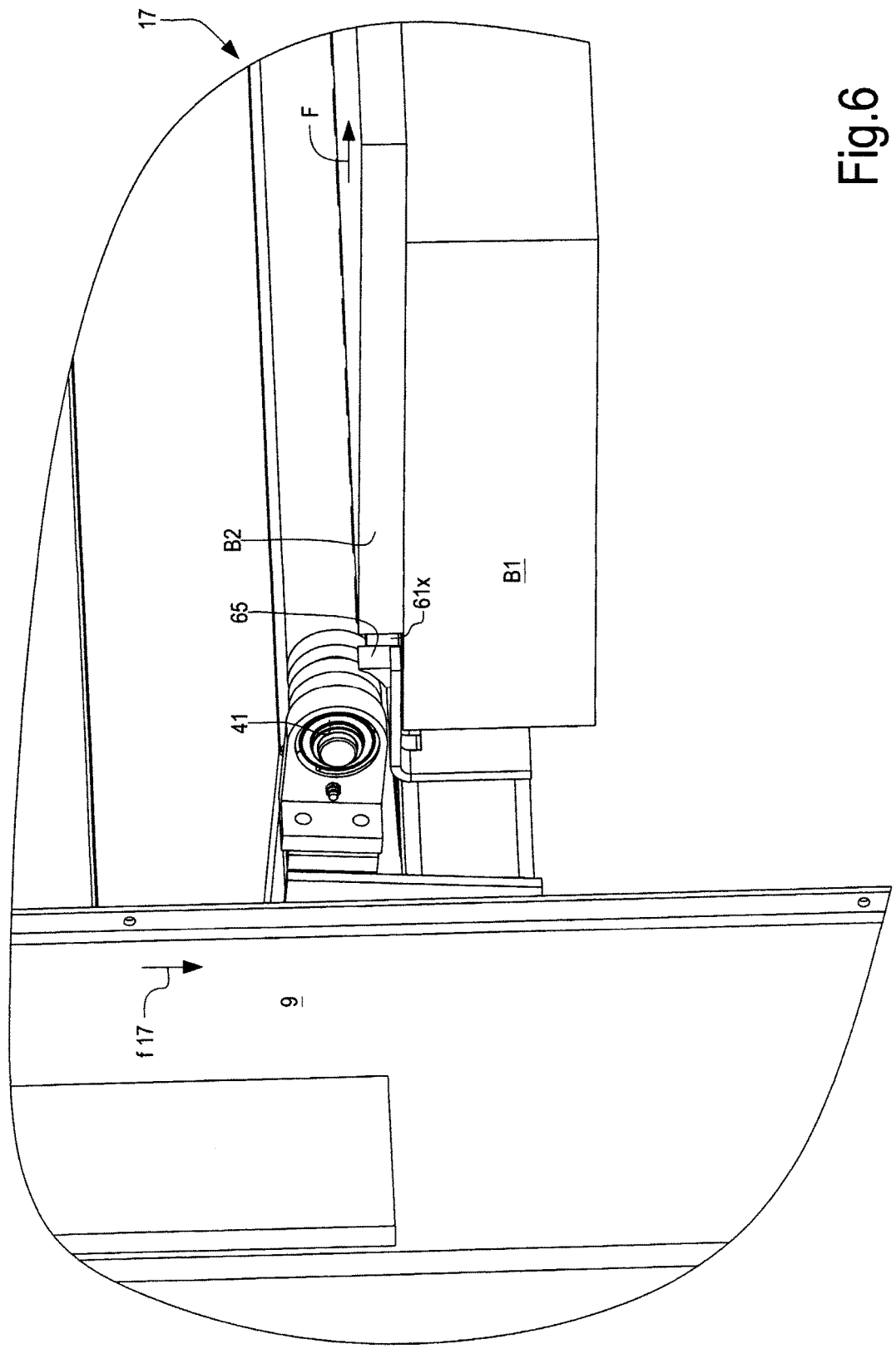

According to some embodiments, in order to ensure a correct piling up of the cardboard sheets C and of the bundles B, a bundle retaining device can be arranged at the sheet discharge end 17 of the sheet conveyor arrangement 3. FIGS. 5 and 6 illustrate details of the bundle retaining device, globally labeled 60. In some embodiments, the bundle retaining device 60 comprises one or preferably a plurality of resilient leaf blades 61, e.g. made of metal. The resilient leaf blades 61 form a sheet braking member, which prevents or reduces undesired displacements of the cardboard sheets of the last formed bundle.

The resilient leaf blades 61 may each have a terminal bent appendage 61X, which form a surface facing the bundles B being formed. The appendages 61X can be housed in indentations 63 formed in a transverse bar 65, which can be arranged adjacent the bottom roller 41, around which the most downstream sheet conveyor 3C is entrained. The bottom of each resilient leaf blade 61 can be provided with a high-friction pad 67, e.g. made of natural or synthetic rubber, plastic material, synthetic foam material, or any other material suitable to apply a grip against the upper surface of the top-most bundle B, when the trailing edge thereof is moved under the bottom roller 41, i.e. under the sheet discharge end 17 of the sheet conveyor arrangement 3.

The operation of the bundle retaining device 60 can be best understood looking at FIGS. 5 and 6 with continuing reference to the sequence of FIGS. 4(A)-4(I). In FIG. 5 the sheet discharge end 17 of the sheet conveyor arrangement 3 has been lifted (arrow f17, FIG. 5) in the lifted position, in order to allow the stack under formation to move according to arrow fx, such that the last-formed bundle B1 is moved with the trailing edge thereof under the sheet discharge end 17. In this position the resilient leaf blades 61 project under the bar 65. Once the stack S has been displaced such that the bundle B1 is partly under the roller 41, i.e. the trailing edge of the bundle B1 is under the sheet discharge end 17, the latter can be lowered according to arrow f17 in FIG. 6, such that the high-friction pads 67 are pressed against the upper surface of the last sheet forming the bundle B1. Formation of the next bundle B2 can start, as shown in FIG. 6, with the trailing edges of the cardboard sheets C, and thus the trailing edge of the bundle B2, abutting against the bar 65.

The cardboard sheets C are fed according to arrow F and slide along the upper surface of the previously formed bundle B1. Friction between the cardboard sheets C and the underneath bundle B1 could cause an undesired displacement of the last cardboard sheets C of bundle B1 in direction F, dragged by the next cardboard sheets C belonging to the next bundle B2. The pressure applied by the resilient laminar leafs 61 prevent the top cardboard sheet of bundle B1 from moving in direction F. When the bundle B2 has been completed, the lifting movement (arrow f17, FIG. 5) of the sheet discharging end 17 of the sheet conveyor arrangement 3 releases the bundle B1, allowing the stack S to move according to fx or fy as required.

While the above description concerns a mode of operation of the sheet stacker 1 for the formation of stacks S, each formed by staggered bundles B, the same sheet stacker can also produce smooth stacks S, i.e. formed by smoothly aligned cardboard sheets C, rather than staggered bundles.

Figure 7A:
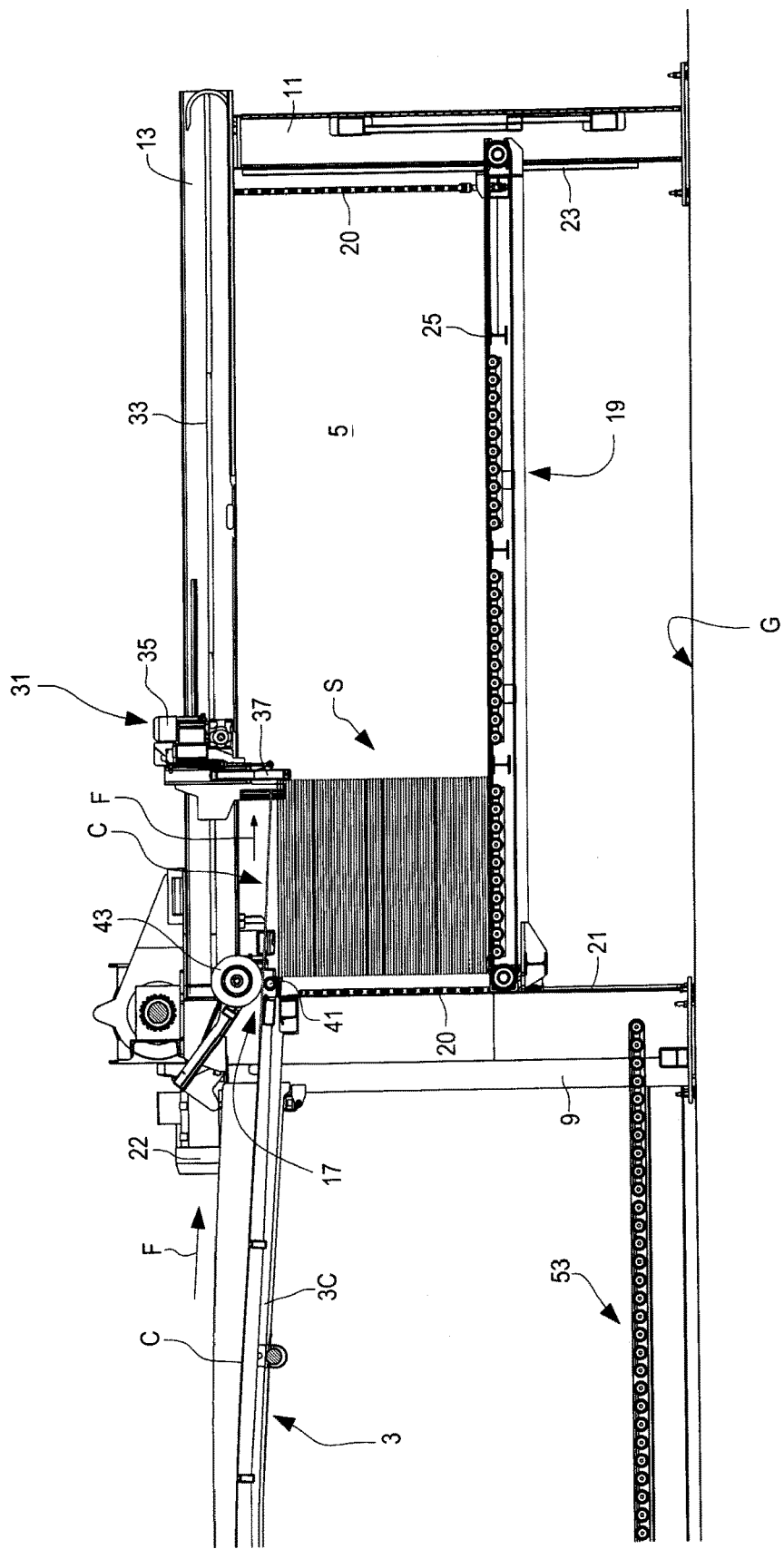
FIGS. 7(A)-7(C) illustrates a sequence of steps for a different mode of operation of the stacker of FIGS. 1-6.
Figure 7B:
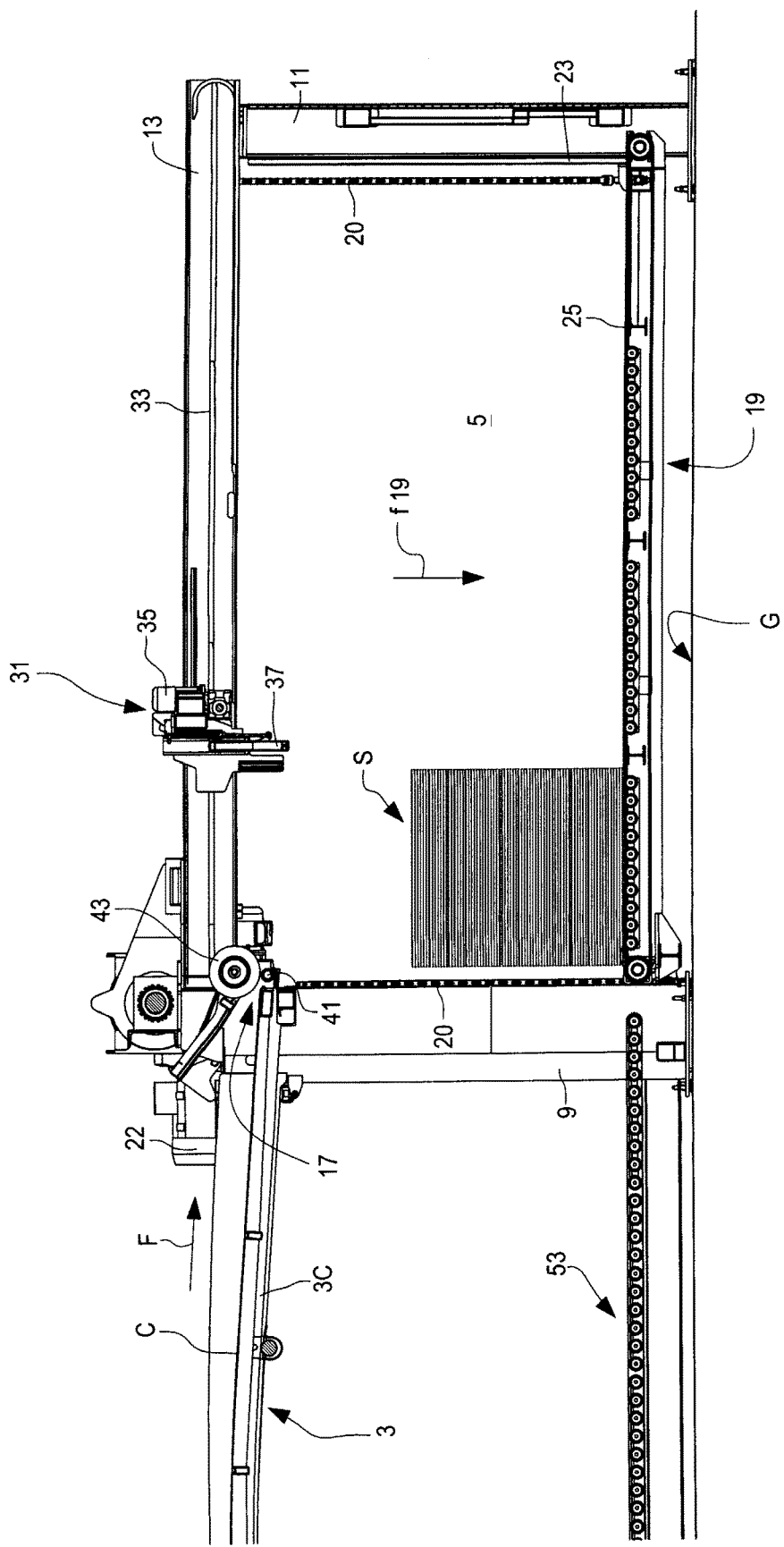
Figure 7C:
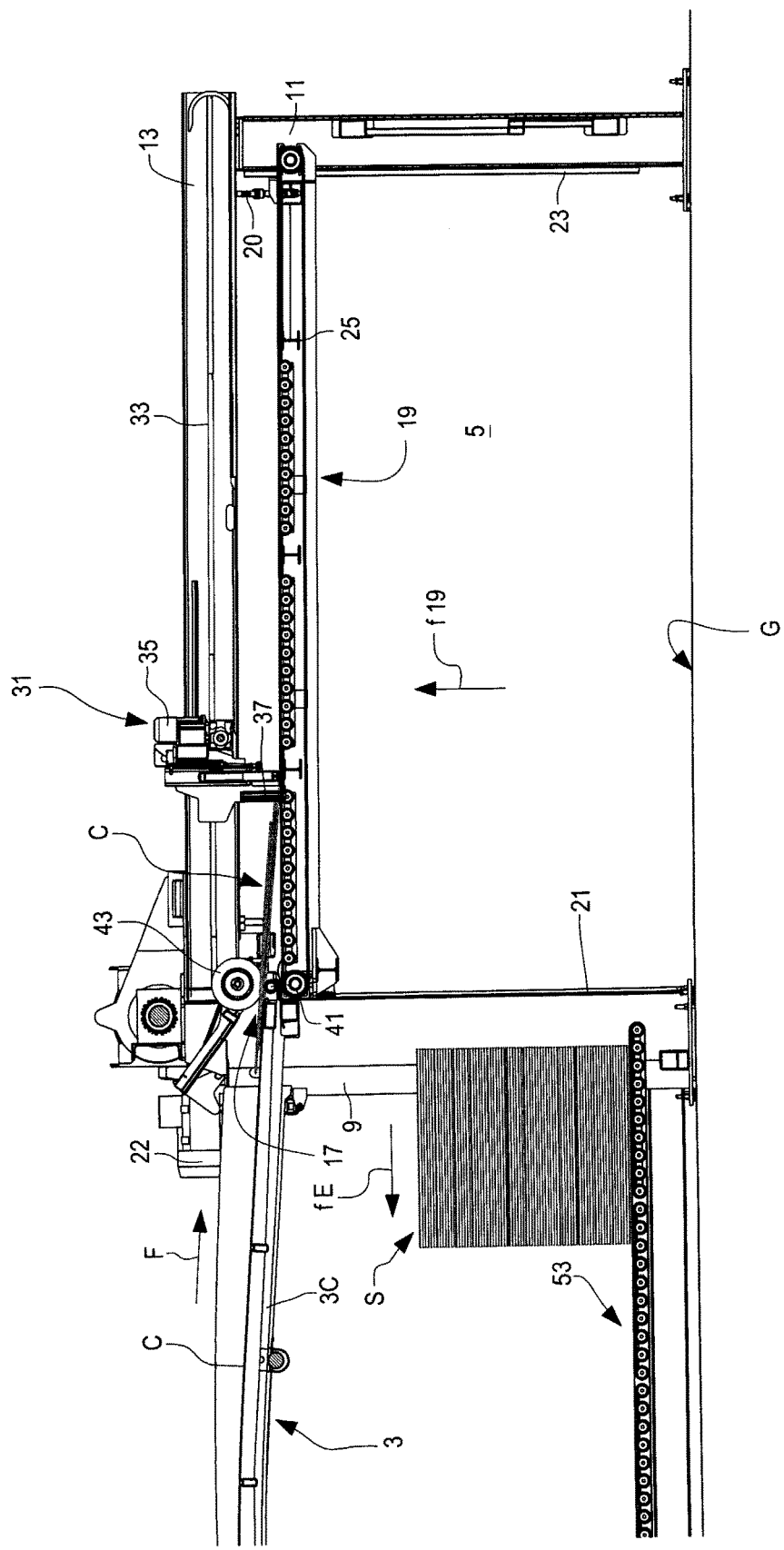

FIGS. 7(A)-7(C) illustrate the final phase of formation of a smooth stack S. In order to produce smooth stacks S, the stack conveyor 25 remains stationary for the time required to pile up the desired total number of cardboard sheets C forming the stack S on the stacker platform 19, such that no staggering is provided between adjacent sheets. FIG. 7(A) shows a step in which the last cardboard sheets C are placed on top of the almost completed stack S. Since during the whole stacking process the stack conveyor 25 remained stationary, all the cardboard sheets C have been aligned against the stop plate 37, and are thus ordered to form a smooth stack S. Upon reaching the desired number of cardboards sheets C, a gap is formed in the sheet flow along the sheet conveyor arrangement 3 and the stacker platform 19 is lowered, see FIG. 7(B), arrow f19. The lowering motion brings the stacking surface, defined by the upper branch of the stack conveyor 25, in alignment with the evacuation conveyor 53.

Once this position has been achieved, the stack conveyor 25 can be activated to perform an evacuation motion, moving the stack S in an evacuation direction fE, see FIG. 7(C), thus transferring the stack S onto the evacuation conveyor 53 and clearing the stacker platform 19. This latter can be lifted again (arrow f19, FIG. 7(C)), at the level of the sheet discharge end 17 of the sheet conveyor arrangement 3, to start the formation of a new stack S.

Irrespective of the kind of stack S formed (either smooth or formed by staggered bundles B), once the stack S is on the evacuation conveyor 53, there is sufficient time to remove the stack S from the sheet stacker 1, while the next stack S is formed in the stacking bay 5. The evacuation conveyor 53, 53a can be designed in a known manner, such that evacuation of the stack S therefrom can be in a direction orthogonal (arrow fEO in FIG. 11) to the direction F. For instance, conveyor rollers can be arranged with their rotation axes orthogonal to direction F, to move the stack under the conveyor 3C, while endless belts can be arranged between pairs of adjacent rollers, the endless belts being designed to move the stacks in a horizontal direction orthogonal to arrow fE.

Figure 8:
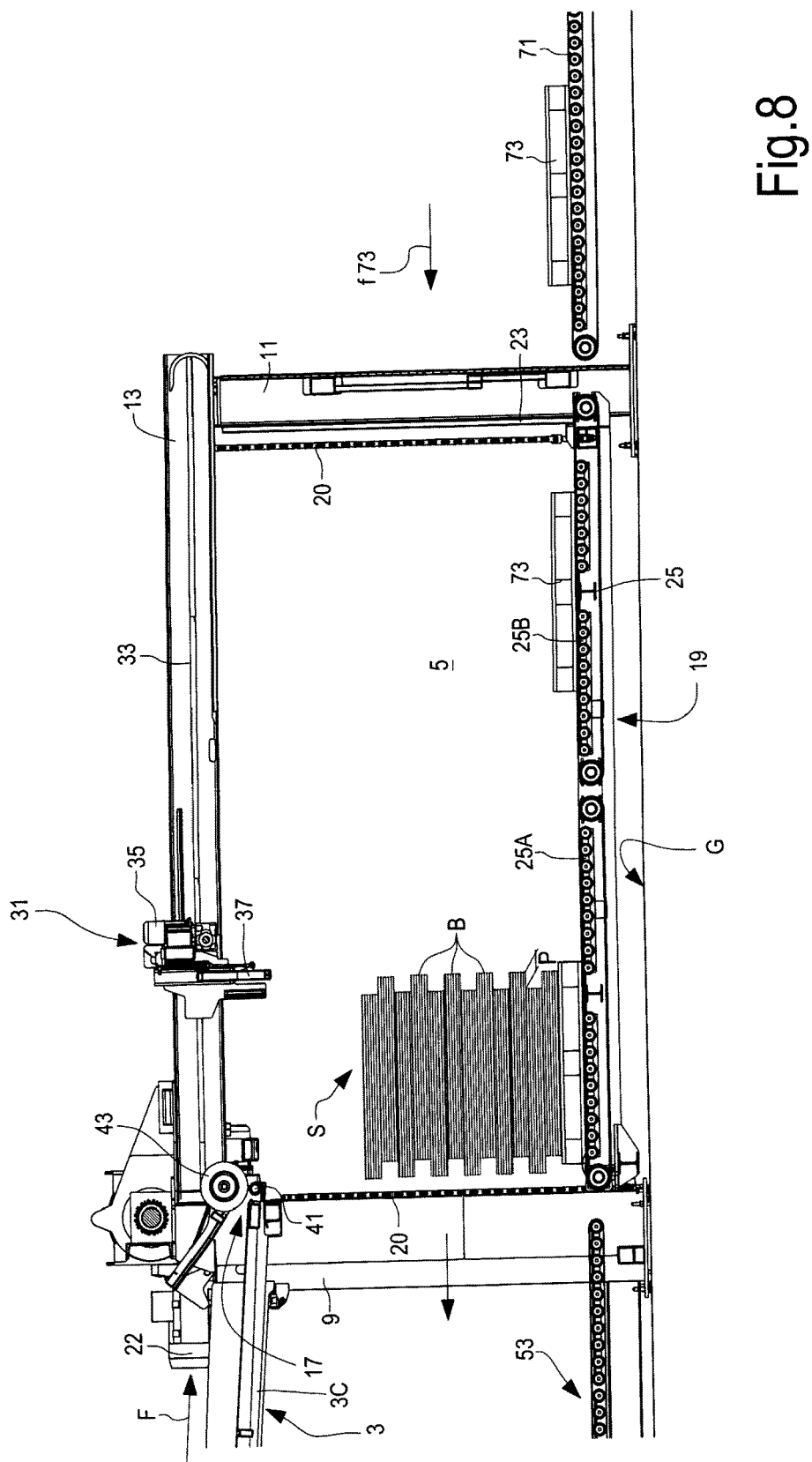
FIG. 8 illustrates a further embodiment of a stacker according to the invention.

In the embodiments disclosed so far, the stack conveyor 25 is formed by an endless conveyor member, which extends along the entire length of the stacking bay 5, between the two opposed rollers 27, 29. A single actuator, e.g. a single electric motor can be used to control the movement of the stack conveyor 25. In other embodiments, a different configuration of the stack conveyor 25 can be provided, e.g. the stack conveyor 25 can be comprised of sequentially arranged stack conveyor members, at least some of which are controlled by separate actuators, e.g. separate electric motors. FIG. 8 schematically illustrates an embodiment wherein the stack conveyor 25 is comprised of a first stack conveyor member 25A and a second conveyor member 25B, arranged in sequence in the direction of the evacuation motion. The remaining parts, elements and components of the sheet stacker 1 of FIG. 8 can be the same as described above and shown in FIGS. 1-7, and will thus not be described again.

In the embodiment of FIG. 8, an auxiliary conveyor 71 is arranged on the side of the stacking bay 5 opposite the sheet conveyor arrangement 3. Depending upon the mode of operation of the sheet stacker 1, the auxiliary conveyor 71 can be used as an evacuation conveyor, or as an additional conveyor, e.g. to deliver stacking pallets or the like on the stacker platform 19. As understood herein a pallet is any means whereon the stack. S of cardboard sheets C can be formed, e.g. for transportation purposes, or for other logistic reasons whatsoever.

In FIG. 8, this latter mode of operation is shown. Single pallets 73 are fed according to arrow f73 on the second stack conveyor member 25B, while the first stack conveyor member 25A is operated in quite the same way as described above, to produce stacks S of staggered bundles B (FIGS. 4(A)-4(I)), or alternatively smooth stacks S (FIGS. 5, 6).

Once the stack S has been completed, the first stack conveyor member 25A performs an evacuation motion, thus transferring the stack S on the evacuation conveyor 53. At the same time, or subsequently, the pallet 73, which is waiting on the second stack conveyor member 25B, can be transferred from the latter on the first conveyor member 25A. Lifting of the stacker platform 19 can start as soon as the stack S has been cleared off the first stack conveyor member 25A and/or a new pallet 73 has been transferred from the auxiliary conveyor 71 on the second stack conveyor member 25B.

In the embodiments disclosed so far, the stacks S are cleared off the stacker platform 19 by means of a clearing movement according to a direction fE which is opposite the direction F of arrival of the cardboard sheets C in the stacking bay 5, such that the stacks S are moved on the evacuation conveyor 53, which is located under the sheet conveyor arrangement 3. As mentioned above, this is particularly advantageous since it reduces the time needed to clear the stacker platform 19, thus improving the overall production rate of the sheet stacker 1. Moreover, since the evacuation conveyor 53 is arranged under the sheet conveyor arrangement 3, the overall footprint of the sheet stacker 1 is reduced.

Figure 9:
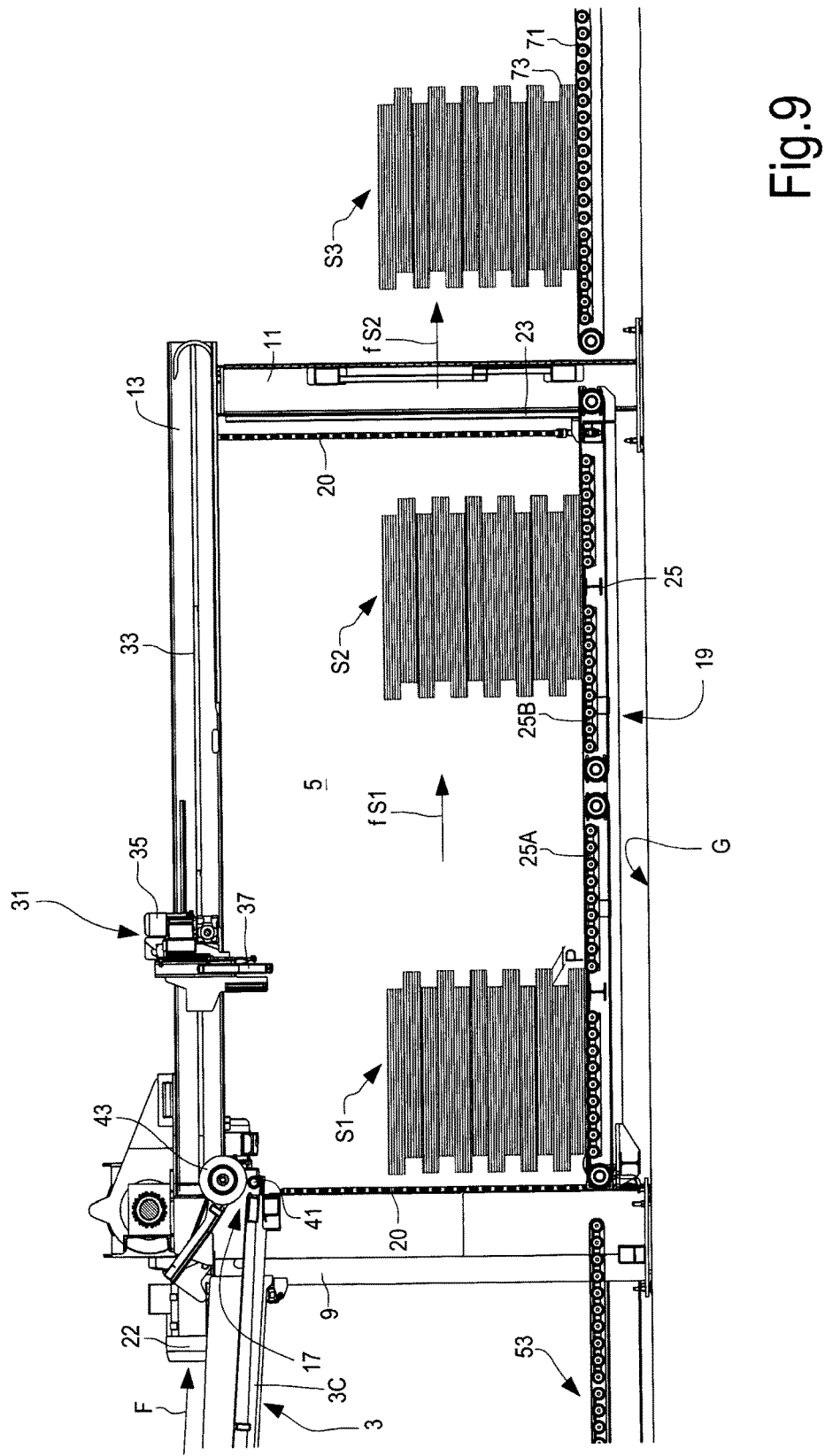
FIG. 9 illustrates a different mode of operation of the stacker of FIG. 8.

The sheet stacker 1 of FIG. 8 can also operate in a different mode, by evacuating the stacks S from the stacking bay 5 onto the auxiliary conveyor 71, which thus performs the function of an evacuation conveyor. This mode of operation is schematically shown in FIG. 9. A completely formed stack S is shown in three subsequent positions, labeled S1, S2 and S3, respectively. It shall be noted that the above situation does normally not arise and is provided only for the sake of explanation of this mode of operation, since when a stack S is present in position S2, on the second stack conveyor member 25B, the first conveyor member 25A is cleared off.

Once the stack S1 has been completed and the stacker platform 19 is in the lower position, at the level of the auxiliary conveyor 71, the first stack conveyor member 25A and second stack conveyor member 25B can be acted upon to evacuate the stack S, moving the latter sequentially from position S1 to position S2 (arrow fS1) and from position S2 to position S3 (arrow fS2). As soon as the stack S has cleared off the second stack conveyor member 25B, the stacker platform 19 can be lifted again, to start the formation of the next stack.

The time required for clearing off the stacker platform 19 is longer than in the previously described modes of operation, since the stroke which the stack S has to travel is longer.

In both modes of operation of FIGS. 8 and 9 the stacks S are formed by a plurality of superimposed and mutually staggered bundles B. It shall be understood, however, that the sheet stacker of this embodiment can be controlled to produce smooth stacks as well.

In yet further embodiments, not shown, the sheet stacker 1 can be configured as shown in FIGS. 8 and 9, i.e. with an auxiliary conveyor 71 possibly operating as an evacuation conveyor arranged on the side opposite the sheet conveyor arrangement, but having a stack conveyor formed by a single conveyor member 25, as illustrated in FIGS. 1 to 7.

In FIGS. 8 and 9 the sheet stacker 1 is provided with the evacuation conveyor 53 arranged under the sheet conveyor arrangement 1, such that the sheet stacker 1 can operate also according to any one of the mode of operations described in connection with FIGS. 1 to 7. In other embodiments, however, the evacuation conveyor 53 can be omitted.

Figure 10:
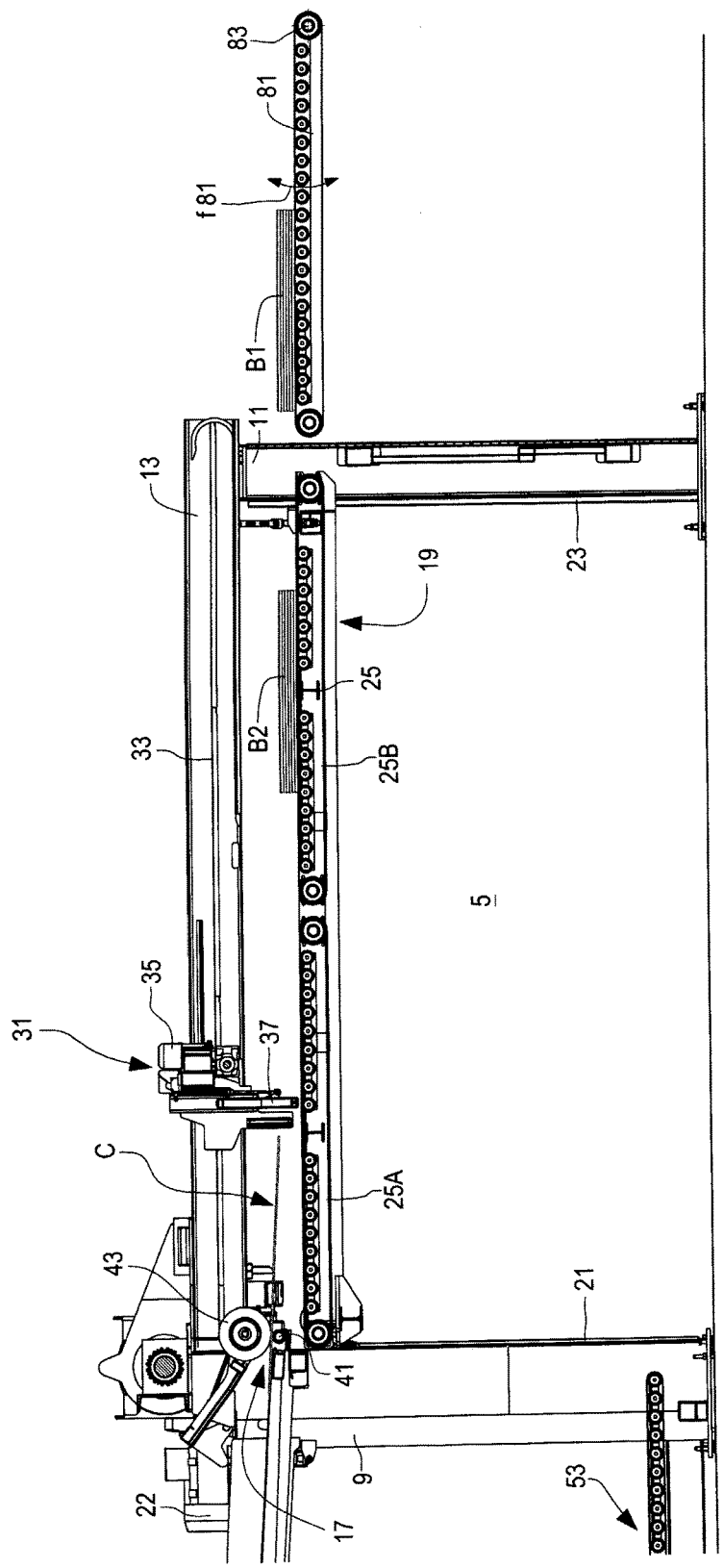
FIG. 10 illustrates a further embodiment of a stacker according to the invention.

FIG. 10 illustrates a further embodiment of a sheet stacker according to the present invention. The same reference number designate the same or equivalent parts, elements or components as already described in connection with the remaining figures and which will not be described again.

The sheet stacker 1 of FIG. 10 comprises an auxiliary conveyor 81 arranged on the side of the stacking bay 5 opposite the sheet conveyor arrangement 3. The auxiliary conveyor 81 can be hinged at one end around a horizontal pivoting axis 83, which is substantially orthogonal to the direction F along which the cardboard sheets are delivered in the stacking hay 5, such that the auxiliary conveyor can pivot according to double arrow f81. In the embodiment of FIG. 10 the stack conveyor 25 is divided into first stack conveyor member 25A and second stack conveyor member 25B. In other embodiments, the stack conveyor 25 can be a one-piece stack conveyor as shown e.g. in FIGS. 1-3. The sheet stacker of FIG. 10 is configured to produce bundles B1, B2, B of cardboard sheets C, which are individually downloaded from the stacking bay 5 on the auxiliary conveyor 81, which operates as an evacuation conveyor.

In FIG. 10 formation of a new bundle of cardboard sheets C has started, while the last formed bundle B2 has been transferred from the first stack conveyor member 25A on the second stack conveyor member 25B. The second last bundle B1 has been previously transferred from the second stack conveyor member 25B to the auxiliary conveyor 81.

The pivoting movement according to f81 of the auxiliary conveyor 81 allows the upstream end thereof, i.e. the end arranged near the stacking bay 5 and opposite the end pivoted at 83, to follow the upwards and downwards movement of the stack conveyor 25, such that processing of the bundles B1, B2 becomes faster. Formation of a new bundle on the first stack conveyor member 25A can start as soon as the last formed bundle B2 has cleared off the first stack conveyor member 25A and has moved on the second stack conveyor member 25B. Therefrom, the last bundle B2 can subsequently be moved onto the auxiliary conveyor 81, the upstream end whereof follows the up and down movement performed by the stack conveyor 25 to allow the next bundle to grow on the first stack conveyor member 25A.

While the invention has been described in connection with what is presently considered to be the most practical and preferred examples, it is to be understood that the invention is not to be limited to the disclosed examples, but on the contrary, is intended to cove various modifications and equivalent arrangements included within the spirit and scope of the appended claims.

What is claimed is:

1. A sheet stacker comprising:
a sheet conveyor arrangement including a plurality of sequentially arranged conveyors, configured for feeding a plurality of sheets in succession in a sheet feeding direction, said sheet conveyor arrangement having a sheet inlet end and a sheet discharge end wherein said sheet discharge end is maintained at a higher height than said sheet inlet end;
a stacking bay, wherein sheets delivered by the sheet conveyor arrangement at the sheet discharge end thereof are formed into stacks; the stacking bay comprising a stacker platform, and wherein the stacker platform is provided with a vertical lifting and lowering movement with respect to a stationary supporting structure and is controlled to move downwards while a stack of sheets is formed thereon;
wherein the stacker platform supports a stack conveyor movable in a direction parallel to a feed direction of the sheets in the stacking bay, configured and controlled to perform at least an evacuation motion, to remove a completed stack from the stacking bay; and the evacuation motion of said stack conveyor is oriented such that a completed stack is moved from the stacking bay onto an evacuation conveyor arranged under the sheet conveyor arrangement, and wherein said evacuation conveyor is arranged to move said completed stack, upon exiting said stack conveyor, in a direction initially opposite said sheet feeding direction and, thereafter, in a direction orthogonal to said feeding direction.

2. The sheet stacker of claim 1, wherein the stack conveyor is further controlled to perform reciprocating staggering motion to form staggered bundles of sheets.

3. The sheet stacker of claim 1, further comprising a stop plate, positioned in the stacking bay above the stacker platform, arranged and configured for stopping the sheets delivered by the sheet conveyor arrangement to the stacking bay.

4. The sheet stacker of claim 2, further comprising a stop plate, positioned in the stacking bay above the stacker platform, arranged and configured for stopping the sheets delivered by the sheet conveyor arrangement to the stacking bay.

5. The sheet stacker of claim 3, wherein the stop plate has a reciprocating vertical movement, which is synchronized with the formation of staggered bundles of sheets.

6. The sheet stacker of claim 4, wherein the stop plate has a reciprocating vertical movement, which is synchronized with the formation of staggered bundles of sheets.

7. The sheet stacker of claim 1, wherein the sheet discharge end of the sheet conveyor arrangement is combined with an actuator, which controls a lifting and lowering movement of the sheet discharge end, which is synchronized with a reciprocating staggering motion of the stack conveyor.

8. The sheet stacker of claim 1, wherein said stack conveyor comprises a first stack conveyor member and a second stack conveyor member, which are sequentially arranged one after another in a direction parallel to a direction of the evacuation motion.

9. The sheet stacker of claim 1, wherein the sheet discharge end is combined with a bundle retaining device, which is configured and arranged for retaining a top-most bundle of the stack when the stack conveyor performs a staggering motion in a direction away from the sheet discharge end.

10. The sheet stacker of claim 9, wherein the bundle retaining device comprises at least one resilient sheet braking member, arranged under the sheet discharge end, between the sheet discharge end and the stack being formed on the stacker platform.

11. A method of forming sheet stacks on a stacking surface, comprising steps as follows:

feeding a plurality of sheets in a feed direction along a sheet conveyor arrangement, including a plurality of sequentially arranged conveyors, towards a stacking bay, the sheet conveyor arrangement having a sheet inlet end and a sheet discharge end wherein said sheet discharge end is maintained at a higher height than said sheet inlet end, wherefrom the sheets are discharged in the stacking bay and formed into stacks on a stack conveyor supported by a stacker platform arranged in the stacking bay;

while a sheet stack gradually grows on the stacking surface, moving the stacker platform gradually downwards to increase distance between the stacker platform and the sheet discharge end of the sheet conveyor arrangement;

once a stack has been completed, moving the stack by the stack conveyor from the stacker platform onto an evacuation conveyor located under the sheet conveyor arrangement, wherein said moving of the stack onto said evacuation conveyor, upon exiting the stack conveyor, is initially in a direction opposite said feed direction and, thereafter, is in a direction orthogonal to said feeding direction.

12. The method of claim 11, wherein during formation of the stack, the stack is divided in mutually superposed and staggered bundles of sheets by reciprocatingly moving the stack conveyor according to a back-and-forth staggering motion, in a direction parallel to a feed direction of the sheets in the stacking bay.

13. The method of claim 12, further comprising a step of lifting the sheet discharge end from top of the stack under formation on the stacker platform when the stack under formation is moved by the stack conveyor towards the sheet discharge end during the back-and-forth staggering motion of the stack conveyor.

14. The method of claim 11, further comprising a step of abutting the sheets coming from the sheet conveyor arrangement against a stationary stop plate arranged above the stacker platform.

15. The method of claim 12, further comprising a step of abutting the sheets coming from the sheet conveyor arrangement against a stationary stop plate arranged above the stacker platform.

16. The method of claim 14, further comprising a step of reciprocatingly moving the stop plate in a vertical direction in synchronism with back-and-forth staggering motion of the stack conveyor.

17. The method of claim 11, wherein said feeding of the plurality of sheets includes providing said plurality of sheets in a shingled arrangement for feeding to said stacking bay.

* * * * *